United States Patent
Lee et al.

(10) Patent No.: US 11,428,426 B2
(45) Date of Patent: Aug. 30, 2022

(54) AIR CONDITIONER AND METHOD FOR CONTROLLING AIR CONDITIONER

(71) Applicant: SAMSUNG ELECTRONICS CO., LTD., Suwon-si (KR)

(72) Inventors: Sang-kyung Lee, Anyang-si (KR);
Jae-hong Kim, Yongin-si (KR);
Hee-jin Suh, Yongin-si (KR);
Chang-soo Lee, Seongnam-si (KR);
Bo-kun Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/047,263

(22) PCT Filed: Apr. 24, 2018

(86) PCT No.: PCT/KR2018/004747
§ 371 (c)(1),
(2) Date: Oct. 13, 2020

(87) PCT Pub. No.: WO2019/198857
PCT Pub. Date: Oct. 17, 2019

(65) Prior Publication Data
US 2021/0164677 A1  Jun. 3, 2021

(30) Foreign Application Priority Data
Apr. 13, 2018 (KR) .................. 10-2018-0043576

(51) Int. Cl.
*F24F 11/30* (2018.01)
*F24F 11/62* (2018.01)
(Continued)

(52) U.S. Cl.
CPC .............. *F24F 11/30* (2018.01); *F24F 11/57* (2018.01); *F24F 11/62* (2018.01); *F24F 11/64* (2018.01);
(Continued)

(58) Field of Classification Search
CPC ... G10L 15/22; G10L 2015/223; G06F 3/167; G06F 3/011; G06F 3/038; F24F 11/30;
(Continued)

(56) References Cited

U.S. PATENT DOCUMENTS 9,129,223 B1 * 9/2015 Velusamy ................. G06N 3/08
2015/0075763 A1 * 3/2015 Kim .................... B60H 1/00742
165/203

(Continued)

FOREIGN PATENT DOCUMENTS

| CN | 103685906 | 3/2014 |
| CN | 103994544 | 8/2014 |

(Continued)

OTHER PUBLICATIONS

International Search Report for PCT/KR2018/004747 dated Jan. 8, 2019, 5 pages, with English Translation.

(Continued)

*Primary Examiner* — Darrin D Dunn
(74) *Attorney, Agent, or Firm* — Nixon & Vanderhye, P.C.

(57) ABSTRACT

The present disclosure relates to a system that obtains at least one of a recommended temperature and an operation mode to be set on an air conditioner by applying a position of a user and an ambient temperature of the air conditioner to a learning model trained by using an artificial intelligence algorithm, and sets at least one of the obtained recommended temperature and the obtained operation mode on the air conditioner. In this case, the learning model may be, for
(Continued)

example, a model generated by using at least one of machine learning, a neural network, or a deep learning algorithm as the artificial intelligence algorithm.

17 Claims, 13 Drawing Sheets

(51) Int. Cl.
  *G05B 19/042* (2006.01)
  *G06N 3/08* (2006.01)
  *F24F 11/57* (2018.01)
  *F24F 11/64* (2018.01)
  *F24F 11/65* (2018.01)
  *F24F 120/20* (2018.01)
  *F24F 120/12* (2018.01)
  *F24F 130/40* (2018.01)
  *F24F 110/10* (2018.01)

(52) U.S. Cl.
  CPC ............ *F24F 11/65* (2018.01); *G05B 19/042* (2013.01); *G06N 3/08* (2013.01); *F24F 2110/10* (2018.01); *F24F 2120/12* (2018.01); *F24F 2120/20* (2018.01); *F24F 2130/40* (2018.01); *G05B 2219/2614* (2013.01)

(58) Field of Classification Search
  CPC .. F24F 11/62; F24F 11/63; F24F 11/56; F24F 11/64; F24F 2120/20; F24F 2110/10; F24F 2120/12; F24F 2120/10; F24F 11/70; F24F 2110/00; F24F 2120/00; G05B 15/02; G05B 2219/2614; G05B 19/042; G05B 2219/2642; G05B 13/0265; G05B 2219/23386; G05B 2219/39441; G06N 20/00; G06N 3/08; G06N 3/084; G06N 5/04
  See application file for complete search history.

(56) References Cited

U.S. PATENT DOCUMENTS

| | | | |
|---|---|---|---|
| 2016/0195856 A1* | 7/2016 | Spero | G06N 5/046 700/90 |
| 2016/0363341 A1* | 12/2016 | Arens | F24F 13/28 |
| 2017/0130978 A1* | 5/2017 | Edwards | F24F 11/79 |
| 2017/0186291 A1* | 6/2017 | Wenus | G01S 3/786 |
| 2018/0047386 A1* | 2/2018 | Garner | G10L 15/08 |
| 2018/0047394 A1* | 2/2018 | Tian | G10L 17/22 |
| 2018/0100662 A1* | 4/2018 | Farahmand | G06N 20/00 |
| 2018/0232662 A1* | 8/2018 | Solomon | G06K 9/6255 |
| 2018/0347840 A1* | 12/2018 | Nelson | G05D 23/1902 |
| 2019/0056127 A1* | 2/2019 | Piech | F24F 11/79 |
| 2019/0103182 A1* | 4/2019 | Borshch | G16H 20/30 |
| 2019/0267004 A1* | 8/2019 | Lee | G06K 9/00228 |
| 2019/0303095 A1* | 10/2019 | Sohoni | G10L 15/22 |
| 2019/0320260 A1* | 10/2019 | Alders | H04R 3/005 |
| 2019/0353379 A1* | 11/2019 | Lee | G05B 15/02 |
| 2019/0361422 A1* | 11/2019 | Katole | H04L 12/4625 |
| 2020/0028703 A1* | 1/2020 | Homsi | G06N 3/08 |
| 2020/0168220 A1* | 5/2020 | Magielse | H05B 47/12 |
| 2020/0240658 A1* | 7/2020 | Kitagawa | F24F 11/56 |
| 2020/0256575 A1* | 8/2020 | Nelson | G10L 15/22 |
| 2020/0275207 A1* | 8/2020 | Zilberman | H04R 3/12 |
| 2021/0080141 A1* | 3/2021 | Tsuboi | F24F 11/63 |

FOREIGN PATENT DOCUMENTS

| | | |
|---|---|---|
| CN | 105246004 | 1/2016 |
| JP | 2001-065948 | 3/2001 |
| JP | 2010-091228 | 4/2010 |
| KR | 1997-0028213 | 6/1997 |
| KR | 10-2008-0083766 | 9/2008 |
| KR | 10-2009-0113628 | 11/2009 |
| KR | 10-2011-0034360 | 4/2011 |
| KR | 10-2012-0056781 | 6/2012 |
| KR | 10-1238661 | 3/2013 |
| KR | 10-2015-0015886 | 2/2015 |
| KR | 10-2016-0087565 | 7/2016 |

OTHER PUBLICATIONS

Written Opinion of the ISA for PCT/KR2018/004747 dated Jan. 8, 2019, 29 pages, with English Translation.
Extended Search Report dated Mar. 1, 2021 in counterpart European Patent Application No. 18914880.2.
Notification of First Office Action dated Oct. 22, 2021 in counterpart Chinese Patent Application No. 201880092075.3 and English-language translation.
Notification of the Second Office Action dated Apr. 13, 2022 in CN Patent Application No. 201880092075.3 and English-language translation.

* cited by examiner (a)

(b)

(a)

(b)

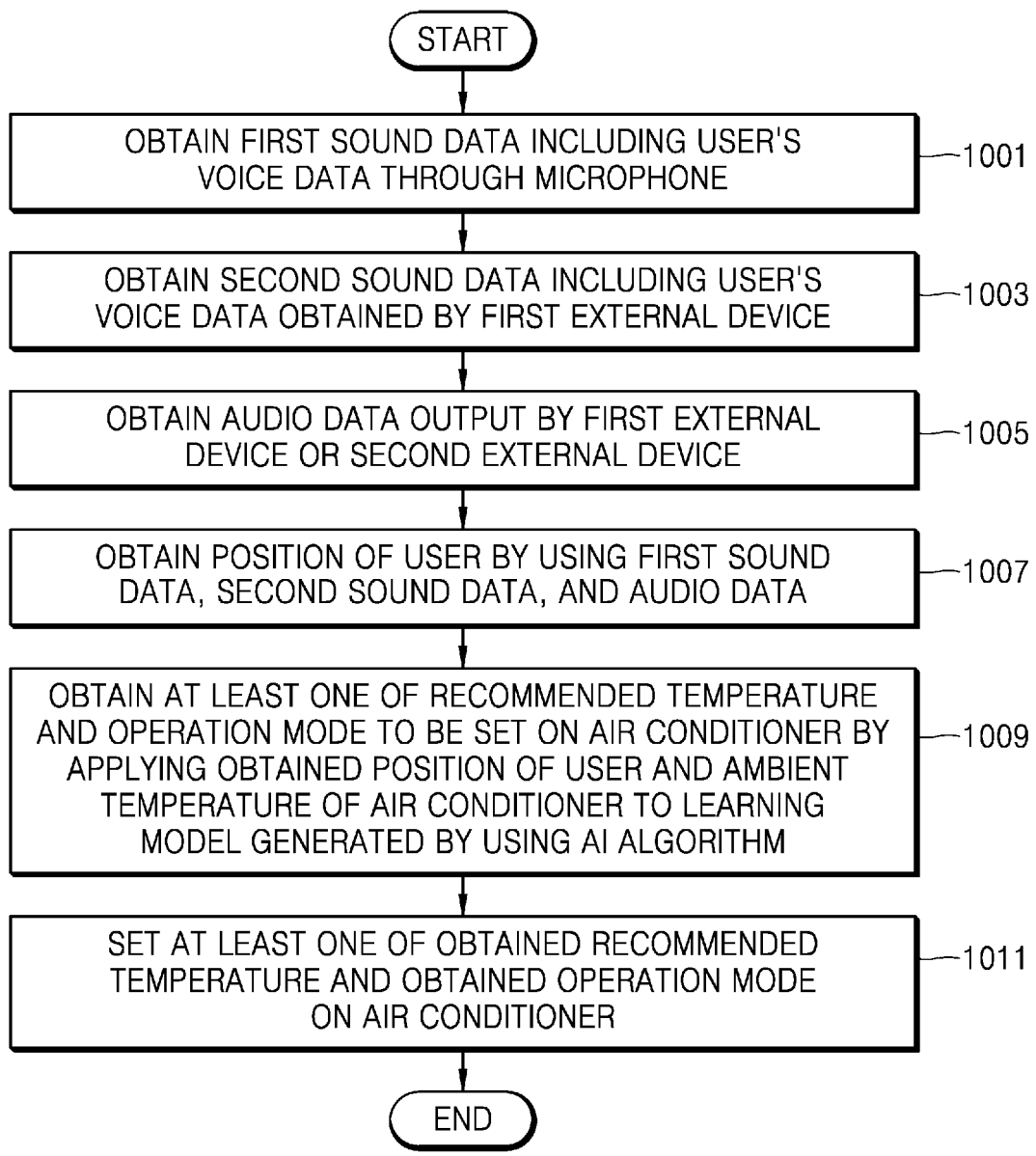

AIR CONDITIONER AND METHOD FOR CONTROLLING AIR CONDITIONER

This application is the U.S. national phase of International Application No. PCT/KR2018/004747 filed Apr. 24, 2018 which designated the U.S. and claims priority to Korean Patent Application No. 10-2018-0043576 filed Apr. 13, 2018, the entire contents of each of which are hereby incorporated by reference.

TECHNICAL FIELD

The present disclosure relates to an air conditioner and a method of controlling the air conditioner.

BACKGROUND ART

An air conditioner may be used as a home appliance to maintain indoor air in an optimal state according to the purpose or use of a designated place. For example, an air conditioner may maintain an indoor space in a cooled state in summer and maintain an indoor space in a heated state in winter. Also, indoor humidity may be adjusted to maintain an indoor space in a clean state.

Generally, an air conditioner may operate according to a set temperature set by a user. For example, an air conditioner may detect an ambient temperature of an indoor space and blow air until the ambient temperature reaches a preset temperature set by a user. Alternatively, an air conditioner may blow air to maintain a set temperature set by a user.

Recently, intelligent services that automatically recognize data and provide information or services associated with the data have been used in various fields. Artificial intelligence (AI) technology used in intelligent services is a technology that implements human-level intelligence. Unlike an existing rule-based smart system, AI technology is a technology that enables a machine to perform learning and determination by itself and become more intelligent. As the use of AI technology has increased, a recognition rate thereof may improve and a user's preference may be understood more accurately. Therefore, the existing rule-based technology has been gradually replaced with deep learning-based AI technology.

AI technology includes machine learning and element technologies using machine learning. Machine learning is an algorithm technology for classifying and learning characteristics of input data by itself. Element technology is a technology for simulating functions such as a human brain's recognition or determination by using a machine learning algorithm. Element technology includes technical fields such as linguistic understanding, visual understanding, inference or prediction, knowledge representation, and motion control.

SUMMARY

When an air conditioner blows air, air may be blown without considering a position of an occupant in a room. The occupant may adjust the direction or intensity of air blowing of the air conditioner, however, when the position of the occupant changes, the air conditioner still blows air without considering the movement of the occupant. Therefore, energy loss may occur due to blowing of air to an unnecessary space.

Therefore, an object of the present disclosure is to consider a position of an occupant and also set a temperature of an air conditioner by using artificial intelligence (AI) technology.

In addition, the technical problem to be solved by the present disclosure is not limited to the above-described technical problem, and other technical problems not described above may be clearly understood by those of ordinary skill in the art from the following description.

An air conditioner according to the present disclosure includes: a microphone; a blowing fan configured to discharge cold air or warm air to the outside; a temperature sensor configured to sense a current temperature around the air conditioner; a communicator configured to communicate with an external device; at least one processor electrically connected to the microphone, the temperature sensor, and the communicator; and a memory electrically connected to the at least one processor, wherein the memory stores at least one instruction executable by the at least one processor to: obtain first sound data including a user's voice data through the microphone when the user utters a voice; obtain, through the communicator, second sound data including the user's voice data that is obtained by a first external device located at a second position different from a first position where the air conditioner is located; obtain audio data output by the first external device or a second external device through the communicator in a situation in which the user utters the voice; obtain a position of the user by using the first sound data, the second sound data, and the audio data; obtain at least one of a recommended temperature and an operation mode to be set on the air conditioner by applying the obtained position of the user and an ambient temperature of the air conditioner to a learning model trained by using an artificial intelligence (AI) algorithm; and set at least one of the obtained recommended temperature and the obtained operation mode on the air conditioner, and the learning model is trained by using at least one of a plurality of ambient temperatures, a plurality of set temperatures, a plurality of pieces of position information, and a plurality of operation modes.

A method of controlling an air conditioner, according to the present disclosure, includes: obtaining first sound data including a user's voice data through a microphone when the user utters a voice; obtaining second sound data including the user's voice data obtained by a first external device; obtaining audio data output by the first external device or a second external device in a situation in which the user utters the voice; obtaining a position of the user by using the first sound data, the second sound data, and the audio data; obtaining at least one of a recommended temperature and an operation mode to be set on the air conditioner by applying the obtained position of the user and an ambient temperature of the air conditioner to a learning model generated by using an artificial intelligence (AI) algorithm; and setting at least one of the obtained recommended temperature and the obtained operation mode on the air conditioner.

According to the present disclosure, provided is a computer program product including a computer-readable recording medium including at least one instruction, wherein the at least one instruction, when executed by a computer, causes the computer to: obtain first sound data including a user's voice data through a microphone when the user utters a voice; obtain second sound data including the user's voice data obtained by a first external device; obtain audio data output by the first external device or a second external device in a situation in which the user utters the voice; obtain a position of the user by using the first sound data, the second sound data, and the audio data; obtain at least one of a recommended temperature and an operation mode to be set on the air conditioner by applying the obtained position of the user and an ambient temperature of the air conditioner to a learning model generated by using an artificial intelligence (AI) algorithm; and set at least one of the obtained recommended temperature and the obtained operation mode on the air conditioner.

According to the present disclosure, at least one of a recommended temperature and an operation mode may be set considering a position of a user with respect to an air conditioner, such that energy loss caused by cooling or heating an unnecessary space is reduced. Also, because it is possible to blow air toward the position of the user, the operation of the user using the air conditioner is minimized and the satisfaction of the user using the air conditioner is increased.

Also, because artificial intelligence (AI) technology is used to automatically recommend a temperature and an operation mode to be set on the air conditioner, the user convenience in controlling the air conditioner may be improved and an ideal cooling or heating environment may be provided to the user.

Also, because a learning model customized for each user using the air conditioner is able to be generated by using AI technology, an optimal recommended temperature and operation mode suitable for each of a plurality of users may be provided.

In addition, effects that may be obtained or predicted from embodiments of the present disclosure are disclosed directly or implicitly in the detailed description of the embodiments of the present disclosure. For example, various effects that are predicted according to embodiments of the present disclosure will be disclosed in the detailed description to be provided below.

BRIEF DESCRIPTION OF THE DRAWINGS

FIG. 10 is a flowchart of an air conditioner according to an embodiment of the present disclosure.

DETAILED DESCRIPTION OF EXAMPLE EMBODIMENTS

Figure 1:
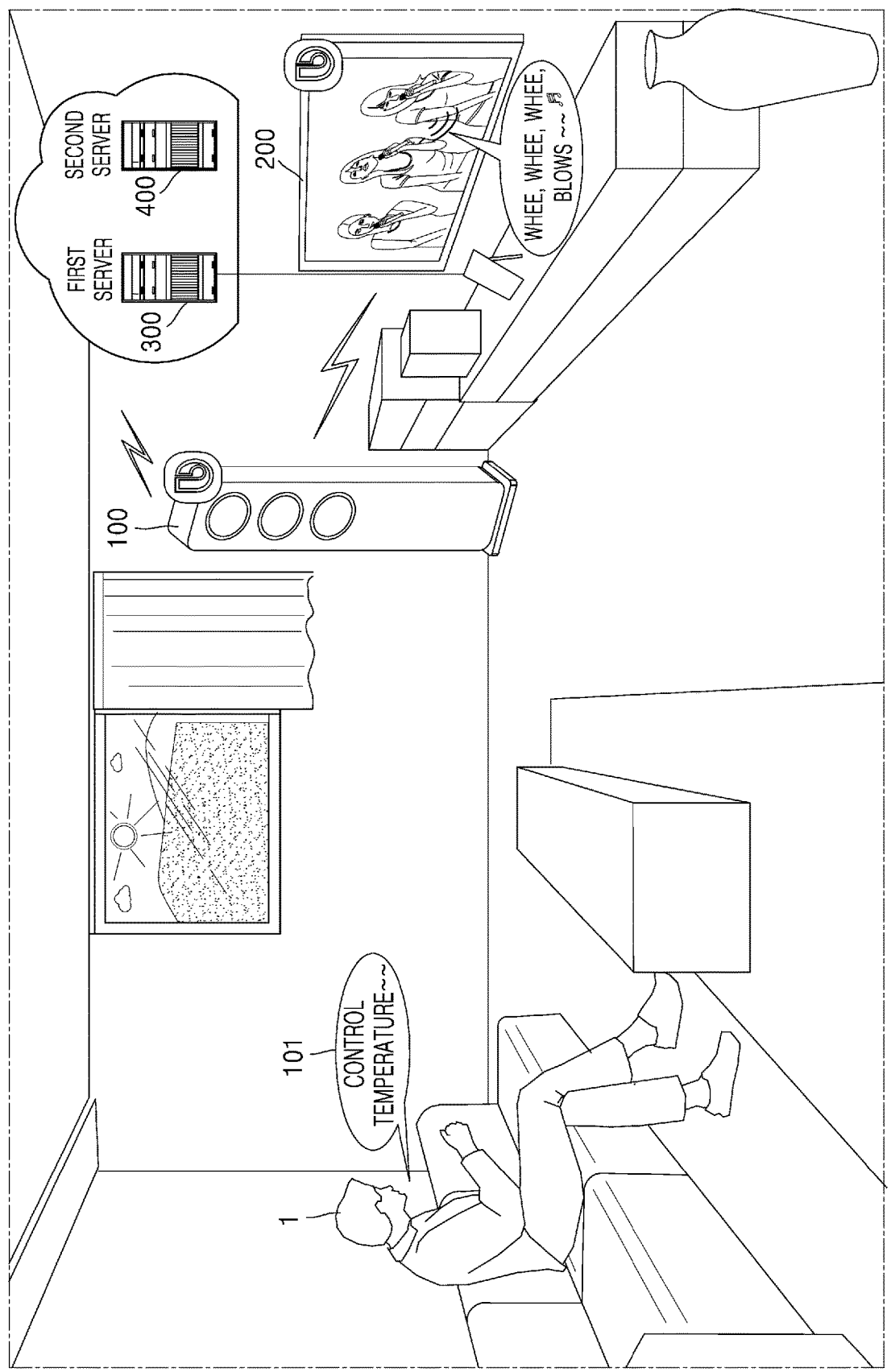
FIGS. 1, 2, 3, 4, 5, and 6 are diagrams illustrating a network system including an air conditioner, according to an embodiment of the present disclosure.

The configurations provided in the embodiments and drawings of this specification are only the preferred examples of the present disclosure, and at there may be various modifications that may replace the embodiments and drawings of this specification at the time of filing of the present application.

A processor 950, a communicator 930, a memory 940, and a microphone 945 of an air conditioner 100 to be described below may correspond to a processor 950, a communicator 930, a memory 940, and a microphone 945 of an air conditioner 100 in FIG. 9 to be described below, respectively.

FIG. 1 is a diagram illustrating a network system including an air conditioner, according to an embodiment of the present disclosure.

The network system may include an air conditioner 100, a first external device 200, a first server 300, and a second server 400. The air conditioner 100 may be a home appliance that controls the temperature or humidity of indoor air. The air conditioner 100 may be a wall-mounted air conditioner or a stand-type air conditioner.

The first external device 200 may be located at a different position from the air conditioner 100. For example, the air conditioner 100 may be located at a first position, and the first external device 200 may be located at a second position. The first external device 200 is a device that is able to output sound. The first external device 200 may include, for example, a television (TV) or an audio device.

The first server 300 may store a learning model configured to receive at least one piece of sound data and at least one piece of audio data and determine a position of a user corresponding to a voice of the user included in the sound data.

The second server 400 may store a learning model configured to receive the position of the user and the ambient temperature of the air conditioner 100 and determine at least one of a recommended temperature and an operation mode to be set on the air conditioner 100.

The first server 300 and the second server 400 may be implemented as one or more servers or a cloud. Also, the learning model included in the first server 300 and the learning model included in the second server 400 may be implemented as one learning model. For example, a server in which the functions of the first server 300 and the second server 400 are integrated may receive at least one piece of sound data and at least one piece of audio data and determine at least one of a recommended temperature and an operation mode to be set on the air conditioner 100.

In various embodiments, the operations of the first server 300 and the second server 400 may be performed by the air conditioner 100 or other indoor external devices. In this case, the air conditioner 100 or other indoor external devices may include at least one of a learning model set to determine a position of a user and a learning model set to determine at least one of a recommended temperature and an operation mode.

In this situation, a user 1 may utter a voice 101 for controlling the air conditioner 100. For example, the user 1 may utter "Control temperature" 101. Therefore, the processor 950 of the air conditioner 100 obtains first sound data including voice data corresponding to the voice 101 of the user through the microphone 945 provided in the air conditioner 100.

In a situation in which the user utters the voice 101, the first external device 200 may also obtain second sound data including voice data corresponding to the voice 101 of the user through the microphone of the first external device 200. The first external device 200 may transmit the obtained second sound data to the air conditioner 100. For example, in a situation in which the user utters the voice 101, the processor 950 of the air conditioner 100 may control the communicator 930 to transmit a request command for requesting the second sound data to the first external device 200. In this case, the situation in which the user utters the voice 101 may include, for example, a situation in which the air conditioner 100 obtains the first sound data or a situation in which the microphone of the air conditioner 100 detects the voice 101 of the user, but the present disclosure is not limited to the above-described example. Also, the situation in which the user utters the voice 101 may include a situation in which the utterance of the voice 101 starts, a situation in which the utterance of the voice 101 ends, or a situation in which the voice 101 is being uttered. Also, the situation in which the user utters the voice 101 may include a certain time before the user utters the voice 101 or a certain time after the user utters the voice 101. In response to the request command from the air conditioner 100, the first external device 200 may transmit the obtained second sound data to the air conditioner 100.

The processor 950 of the air conditioner 100 may obtain the first sound data and the second sound data through the communicator 930. Also, in a situation in which the user utters the voice 101, the processor 950 of the air conditioner 100 may obtain audio data being output by the first external device 200 through the communicator 930. For example, when the first external device 200 is a TV, the audio data may include audio data being output from the TV. In an embodiment, the processor 950 of the air conditioner 100 may obtain the second sound data and the audio data together.

When the first sound data, the second sound data, and the audio data are obtained, the processor 950 of the air conditioner 100 may obtain the position of the user 1 by using the first sound data, the second sound data, and the audio data.

For example, the processor 950 of the air conditioner 100 may extract voice data corresponding to the voice 101 of the user by removing the audio data from the first sound data, and may extract voice data corresponding to the voice 101 of the user by removing the audio data from the second sound data. In this case, the extracting of the voice data by removing the audio data may include extracting the voice 101 of the user by removing external environmental noise together with the audio data. Next, the processor 950 of the air conditioner 100 may obtain the position of the user 1 based on at least one of a phase difference and an amplitude difference between the pieces of extracted voice data.

In another embodiment, the processor 950 of the air conditioner 100 may obtain the position of the user 1 by applying the first sound data, the second sound data, and the audio data to a learning model generated by using an artificial intelligence (AI) algorithm. The learning model may be, for example, in a state of being stored in the memory 940 of the air conditioner 100 or in a state of being stored in the external first server 300 that is able to communicate with the air conditioner 100. The learning model may be, for example, a learning model trained by using at least one of a plurality of pieces of sound data, a plurality of pieces of audio data, and position information.

When the learning model is stored in the first server 300, the processor 950 of the air conditioner 100 may transmit the first sound data, the second sound data, and the audio data to the first server 300. The first server 300 may determine the position of the user 1 by applying the received data to the stored learning model. The first server 300 may transmit the determined position of the user 1 to the air conditioner 100. The air conditioner 100 may obtain the position of the user 1 from the first server 300.

When the position of the user is obtained, the processor 950 of the air conditioner 100 may determine at least one of the recommended temperature and the operation mode to be set on the air conditioner 100 by using the obtained position of the user and the ambient temperature of the air conditioner 100 measured in a situation in which the user utters the voice 101.

In this case, when the voice of the user is recognized as a voice request to control the temperature of the air conditioner 100, the processor 950 of the air conditioner 100 may determine at least one of the recommended temperature and the operation mode to be set on the air conditioner 100. In this case, the situation in which the user utters the voice 101 may include, for example, a situation in which the air conditioner 100 obtains the first sound data or a situation in which the microphone of the air conditioner 100 detects the voice 101 of the user, but the present disclosure is not limited to the above-described example. Also, the situation in which the user utters the voice 101 may include a situation in which the utterance of the voice 101 starts, a situation in which the utterance of the voice 101 ends, or a situation in which the voice 101 is being uttered. Also, the situation in which the user utters the voice 101 may include a certain time before the user utters the voice 101 or a certain time after the user utters the voice 101.

In various embodiments, the processor 950 of the air conditioner 100 may obtain at least one of the recommended temperature and the operation mode to be set on the air conditioner 100 by applying the obtained position of the user and the ambient temperature of the air conditioner 100 measured in a situation in which the user utters the voice to a learning model generated by using an AI algorithm. The learning model may be, for example, in a state of being stored in the memory 940 of the air conditioner 100 or in a state of being stored in the external second server 400 that is able to communicate with the air conditioner 100. The learning model may be, for example, a learning model trained by using at least one of a plurality of ambient temperatures, a plurality of set temperatures, a plurality of pieces of position information, and a plurality of operation modes.

When the learning model is stored in the second server 400, the processor 950 of the air conditioner 100 may transmit the position of the user and the ambient temperature of the air conditioner 100 to the second server 400. The second server 400 may determine at least one of the recommended temperature and the operation mode to be set on the air conditioner 100 by applying the received data to the stored learning model. The air conditioner 100 may obtain at least one of the recommended temperature and the operation mode from the second server 400.

When at least one of the recommended temperature and the operation mode to be set on the air conditioner 100 is obtained, the air conditioner 100 may set at least one of the obtained recommended temperature and the obtained operation mode on the air conditioner 100.

Figure 2:
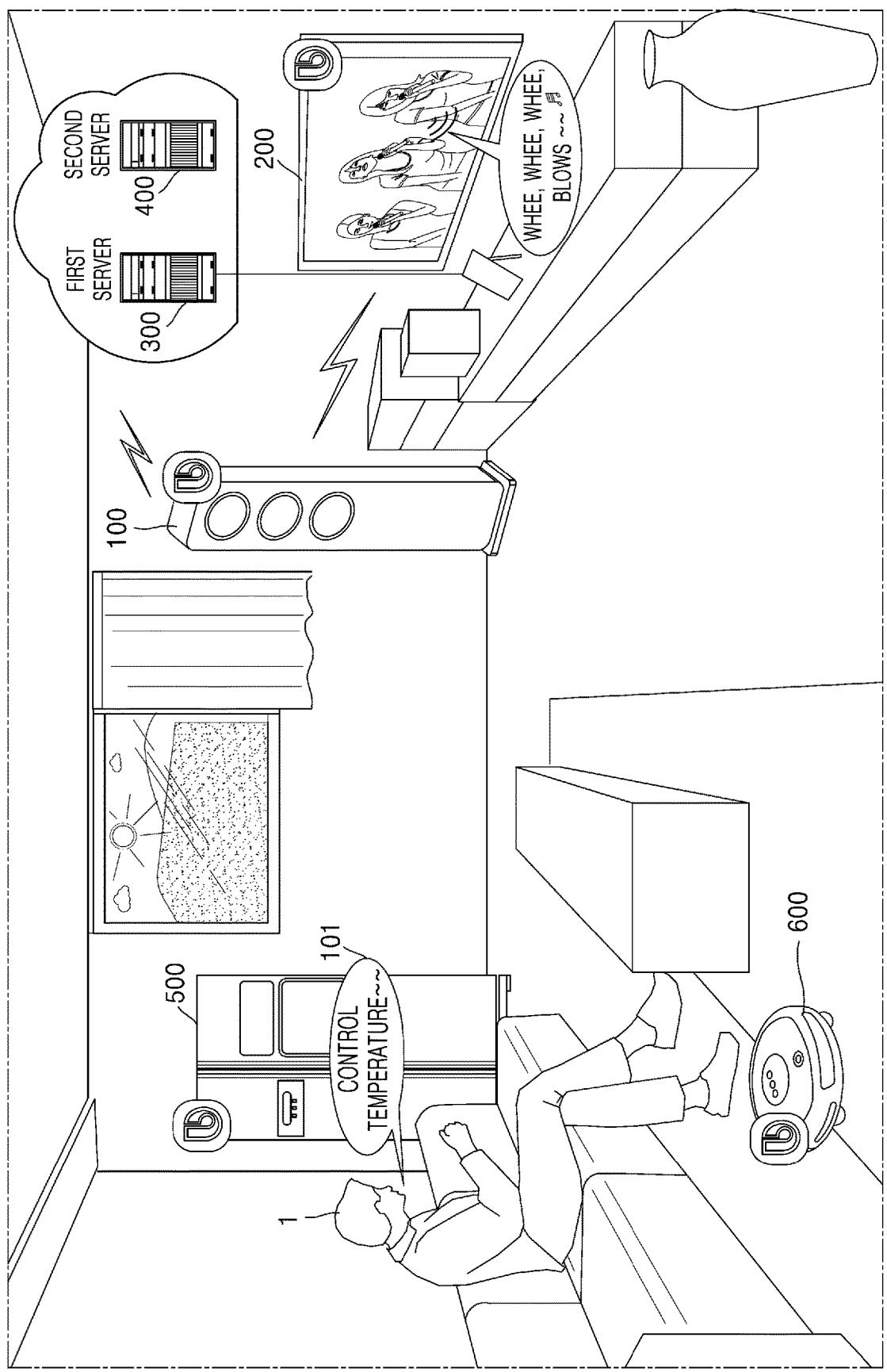

FIG. 2 is a diagram illustrating a network system including an air conditioner, according to another embodiment of the present disclosure.

The network system may include an air conditioner 100, a first server 300, a second server 400, a first external device 200, and a second external device 500. The air conditioner 100, the first external device 200, the first server 300, and the second server 400 may correspond to the air conditioner 100, the first external device 200, the first server 300, and the second server 400 in FIG. 1, respectively. The second external device 500 may be a device including a microphone. For example, the second external device 500 may generate (or convert) a voice or a sound received from the outside into an electrical signal by using the microphone. Alternatively, the second external device 500 may recognize voice data or audio data converted through the microphone.

In this situation, a user 1 may utter a voice 101 for controlling the air conditioner 100. The processor 950 of the air conditioner 100 may obtain first sound data including voice data corresponding to the voice 101 of the user through the microphone 945 provided in the air conditioner 100.

In a situation in which the user utters the voice 101, the second external device 500 may obtain second sound data including voice data corresponding to the voice 101 of the user through the microphone. The second external device 500 may transmit the obtained second sound data to the air conditioner 100. For example, in a situation in which the user utters the voice 101, the processor 950 of the air conditioner 100 may control the communicator 930 to transmit a request command for requesting the second sound data to the second external device 500. In response to the request command from the air conditioner 100, the second external device 500 may transmit the obtained second sound data to the air conditioner 100.

In a situation in which the user utters the voice 101, the processor 950 of the air conditioner 100 may obtain audio data being output by the first external device 200 through the communicator 930.

When the first sound data, the second sound data, and the audio data are obtained, the processor 950 of the air conditioner 100 may obtain the position of the user 1 by using the first sound data, the second sound data, and the audio data. In the example in which the processor 950 of the air conditioner 100 obtains the position of the user 1, descriptions redundant to those provided above with reference to FIG. 1 will be omitted.

When the position of the user is obtained, the processor 950 of the air conditioner 100 may obtain at least one of a recommended temperature and an operation mode to be set on the air conditioner 100 by using the obtained position of the user and the ambient temperature of the air conditioner 100 measured in a situation in which the user utters the voice 101.

For example, the processor 950 of the air conditioner 100 may obtain at least one of the recommended temperature and the operation mode to be set on the air conditioner 100 by applying the obtained position of the user and the ambient temperature of the air conditioner 100 measured in a situation in which the user utters the voice to a learning model generated by using an AI algorithm. When the recommended temperature and the operation mode to be set on the air conditioner 100 are obtained, the processor 950 of the air conditioner 100 may set at least one of the determined recommended temperature and the determined operation mode on the air conditioner 100.

Figure 3:
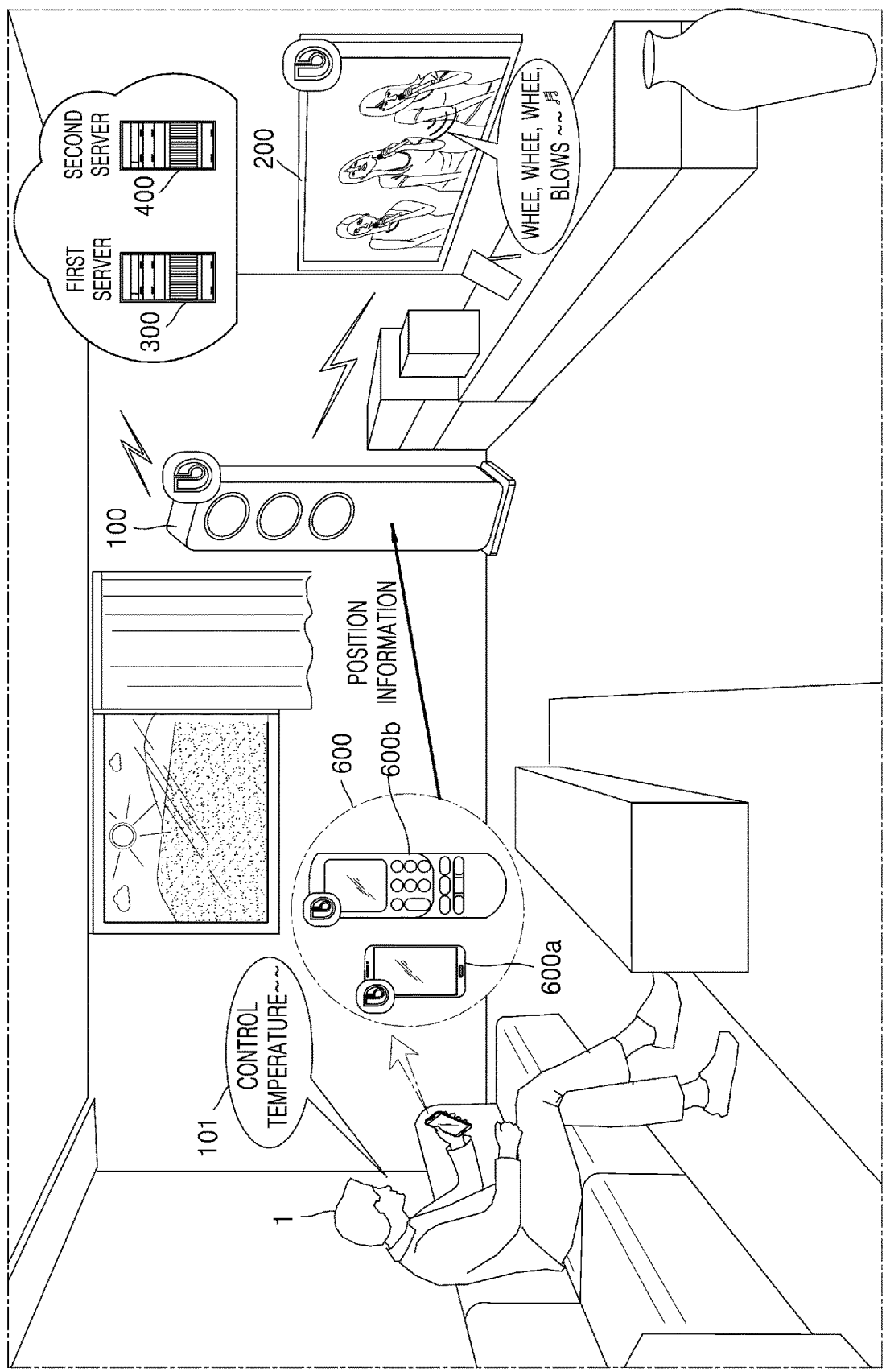

FIG. 3 is a block diagram of a network system according to another embodiment of the present disclosure.

The network system may include an air conditioner 100, a first external device 200, a first server 300, a second server 400, and a fourth external device 600. The air conditioner 100, the first external device 200, the first server 300, and the second server 400 may correspond to the air conditioner 100, the first external device 200, the first server 300, and the second server 400 in FIG. 1, respectively. The fourth external device 600 may be a device that remotely controls the air conditioner 100. For example, the user 1 may hold the fourth external device 600 and remotely control the air conditioner 100 by performing a user input through the fourth external device 600.

Like a user terminal 600*a*, the fourth external device 600 may be a smart phone, a cellular phone, or a tablet personal computer (PC), on which an air conditioner control application (or app) is installed. Alternatively, like a user terminal 600*b*, the fourth external device 600 may be a remote controller dedicated to the air conditioner. The fourth external device 600 may remotely control the air conditioner 100. For example, the fourth external device 600 may transmit a control command to the air conditioner 100 by using Zig-Bee, wireless fidelity (WiFi), Bluetooth, mobile communication, local area network (LAN), wide area network (WAN), Infrared Data Association (IrDA), or radio frequency (RF) communication technologies such as ultra-high frequency (UHF) and very high frequency (VHF).

The fourth external device 600 may include a microphone through which voice or sound received from the outside is converted into an electrical signal. Alternatively, the fourth external device 600 may obtain and store position information about the fourth external device 600.

In this situation, a user 1 may utter a voice 101 for controlling the air conditioner 100. The processor 950 of the air conditioner 100 may obtain first sound data including voice data corresponding to the voice 101 of the user through the microphone 945 provided in the air conditioner 100. Also, the fourth external device 600 may obtain second sound data including voice data corresponding to the voice 101 of the user through the microphone. Alternatively, the fourth external device 600 may obtain position information about the fourth external device 600 in a situation in which the user utters the voice 101. The fourth external device 600 may transmit the second sound data and/or the position information to the air conditioner 100.

The processor 950 of the air conditioner 100 may obtain the second sound data and/or the position information through the communicator 930.

In a situation in which the user utters the voice 101, the processor 950 of the air conditioner 100 may obtain audio data being output by the first external device 200 through the communicator 930.

When at least one of the first sound data, the second sound data, the audio data, and the position information about the external device (e.g., the fourth external device 600) held by the user 1 is obtained, the processor 950 of the air conditioner 100 may obtain the position of the user 1 by using at least one of the first sound data, the second sound data, the audio data, and the position information. For example, the processor 950 of the air conditioner 100 may obtain the position of the user 1 by applying at least one of the first sound data, the second sound data, the audio data, and the position information to a learning model generated by using an AI algorithm.

As another example, the processor 950 of the air conditioner 100 may obtain the position of the user 1 by using only the position information about the external device (e.g., the fourth external device 600) held by the user 1.

When the position of the user is obtained, the processor 950 of the air conditioner 100 may determine at least one of a recommended temperature and an operation mode to be set on the air conditioner 100 by using the obtained position of the user and the ambient temperature of the air conditioner 100 measured in a situation in which the user utters the voice 101. When at least one of the recommended temperature and the operation mode to be set on the air conditioner 100 is determined, the processor 950 of the air conditioner 100 may set at least one of the determined recommended temperature and the determined operation mode on the air conditioner 100.

Figure 4:
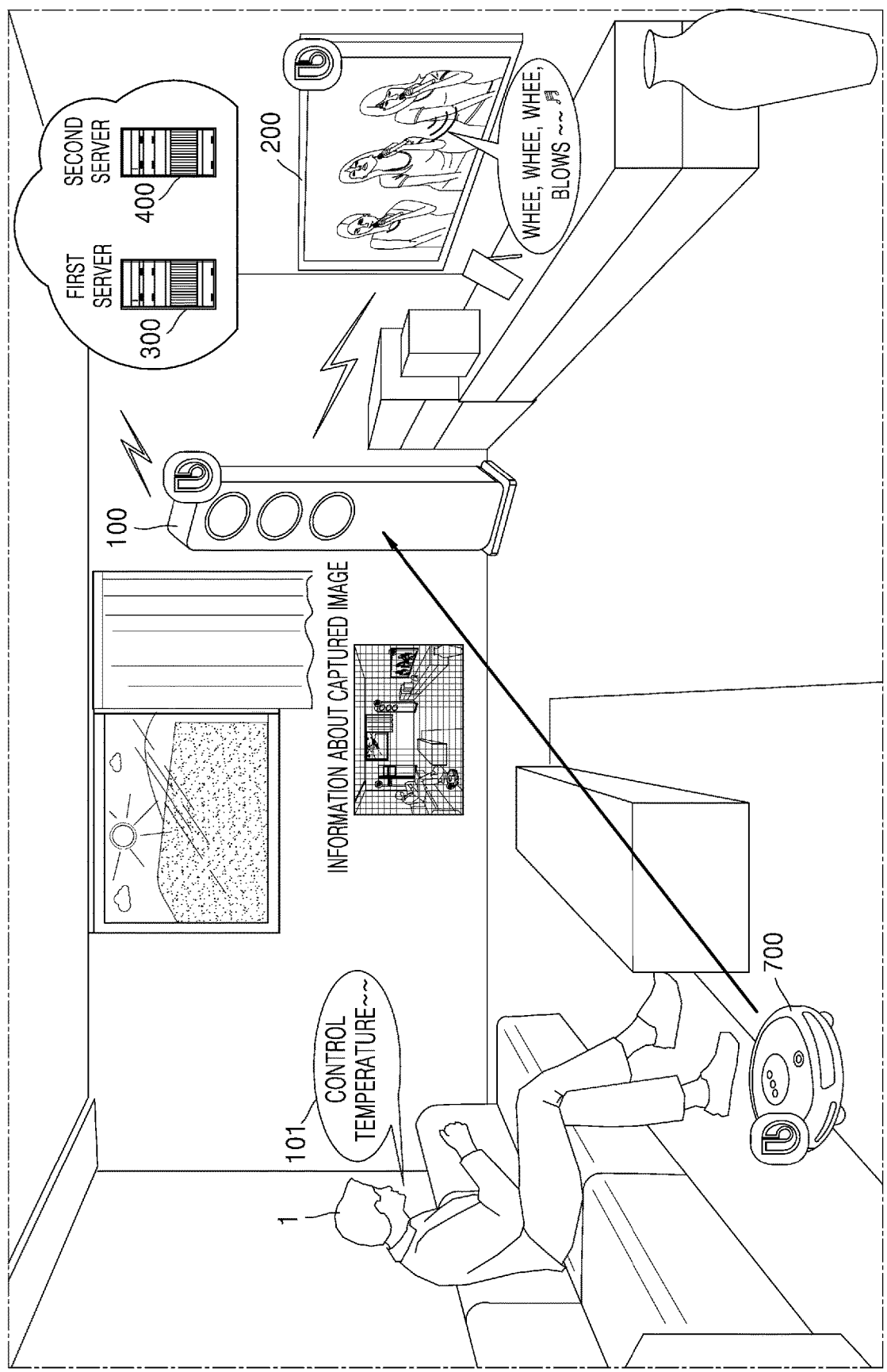

FIG. 4 is a block diagram of a network system according to another embodiment of the present disclosure.

The network system may include an air conditioner 100, a first external device 200, a first server 300, a second server 400, and a fifth external device 700. The air conditioner 100, the first external device 200, the first server 300, and the second server 400 may correspond to the air conditioner 100, the first external device 200, the first server 300, and the second server 400 in FIG. 1, respectively. The fifth external device 700 is a device capable of capturing an image and may include, for example, a robot cleaner, a security camera, and the like.

In this situation, a user 1 may utter a voice 101 for controlling the air conditioner 100. The processor 950 of the air conditioner 100 may obtain first sound data including voice data corresponding to the voice 101 of the user through the microphone 945 provided in the air conditioner 100.

The fifth external device 700 may use a camera to capture an image of a position at which the user is located. The fifth external device 700 may transmit information about the captured image to the air conditioner 100. The information about the captured image may be an image, a video, or a plurality of images captured over time.

In a situation in which the user utters the voice 101, the processor 950 of the air conditioner 100 may obtain audio data being output by the first external device 200 through the communicator 930. Also, the processor 950 of the air conditioner 100 may obtain information about an image captured by the fifth external device 700. The information about the captured image may include, for example, an image of a user 1. Alternatively, the information about the captured image may include map information about a room where the air conditioner 100 is located. The map information may be information generated based on information about an image captured by the fifth external device 700 (e.g., a robot cleaner).

When the first sound data, the audio data, and the information about the captured image are obtained, the processor 950 of the air conditioner 100 may obtain the position of the user 1 by using at least one of the first sound data, the audio data, and the information about the captured image. For example, the processor 950 of the air conditioner 100 may obtain the position of the user 1 by applying at least one of the first sound data, the audio data, and the information about the captured image to a learning model generated by using an AI algorithm.

When the position of the user is obtained, the processor 950 of the air conditioner 100 may determine at least one of a recommended temperature and an operation mode to be set on the air conditioner 100 by using the obtained position of the user and the ambient temperature of the air conditioner 100 in a situation in which the user utters the voice 101. When the recommended temperature and the operation mode to be set on the air conditioner 100 are obtained, the processor 950 of the air conditioner 100 may set at least one of the determined recommended temperature and the determined operation mode on the air conditioner 100.

Figure 5:
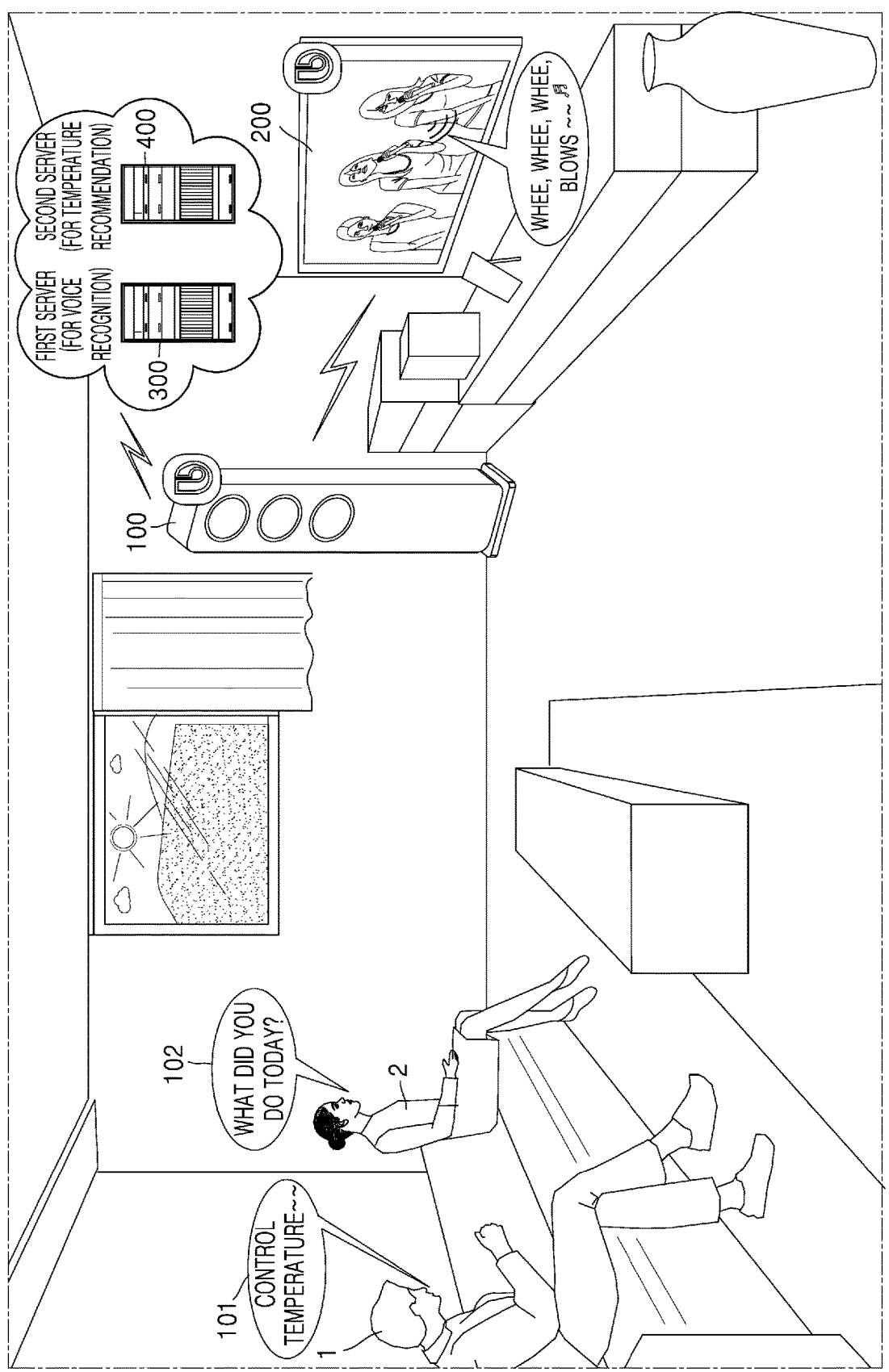

FIG. 5 is a block diagram of a network system according to another embodiment of the present disclosure.

The network system may include an air conditioner 100, a first external device 200, a first server 300, and a second server 400. The air conditioner 100, the first external device 200, the first server 300, and the second server 400 may correspond to the air conditioner 100, the first external device 200, the first server 300, and the second server 400 in FIG. 1, respectively.

In this situation, a user 1 may utter a voice 101 for controlling the air conditioner 100. For example, the user 1 may utter "Control temperature" 101. While the user 1 utters the voice 101, another user 2 may also utter a voice 102. For example, the other user 2 may utter "What did you do today?" 102. The processor 950 of the air conditioner 100 may obtain first sound data including first voice data corresponding to the voice 101 of the user 1 and second voice data corresponding to the voice 102 of the other user 2 through the microphone 945 provided in the air conditioner 100.

In a situation in which a plurality of voices 101 and 102 are uttered, the first external device 200 may also obtain second sound data including the first voice data and the second voice data through the microphone of the first external device 200. The first external device 200 may transmit the obtained second sound data to the air conditioner 100.

The processor 950 of the air conditioner 100 may obtain the first sound data and the second sound data through the communicator 930. Also, in a situation in which a plurality of voices 101 and 102 are uttered, the processor 950 of the air conditioner 100 may obtain audio data being output by the first external device 200 through the communicator 930.

When the first sound data, the second sound data, and the audio data are obtained, the processor 950 of the air conditioner 100 may obtain the positions of a plurality of users 1 and 2 by using the first sound data, the second sound data, and the audio data. For example, the processor 950 of the air conditioner 100 may obtain the positions of the users 1 and 2 by applying the first sound data, the second sound data, and the audio data to a learning model generated by using an AI algorithm.

The processor 950 of the air conditioner 100 may determine at least one of a recommended temperature and an operation mode to be set on the air conditioner 100 by using the positions of the users 1 and 2 and the ambient temperature of the air conditioner 100 measured in a situation in which the user utters the voice 101. Next, the processor 950 of the air conditioner 100 may set at least one of the determined recommended temperature and the determined operation mode to the air conditioner 100.

Figure 6:
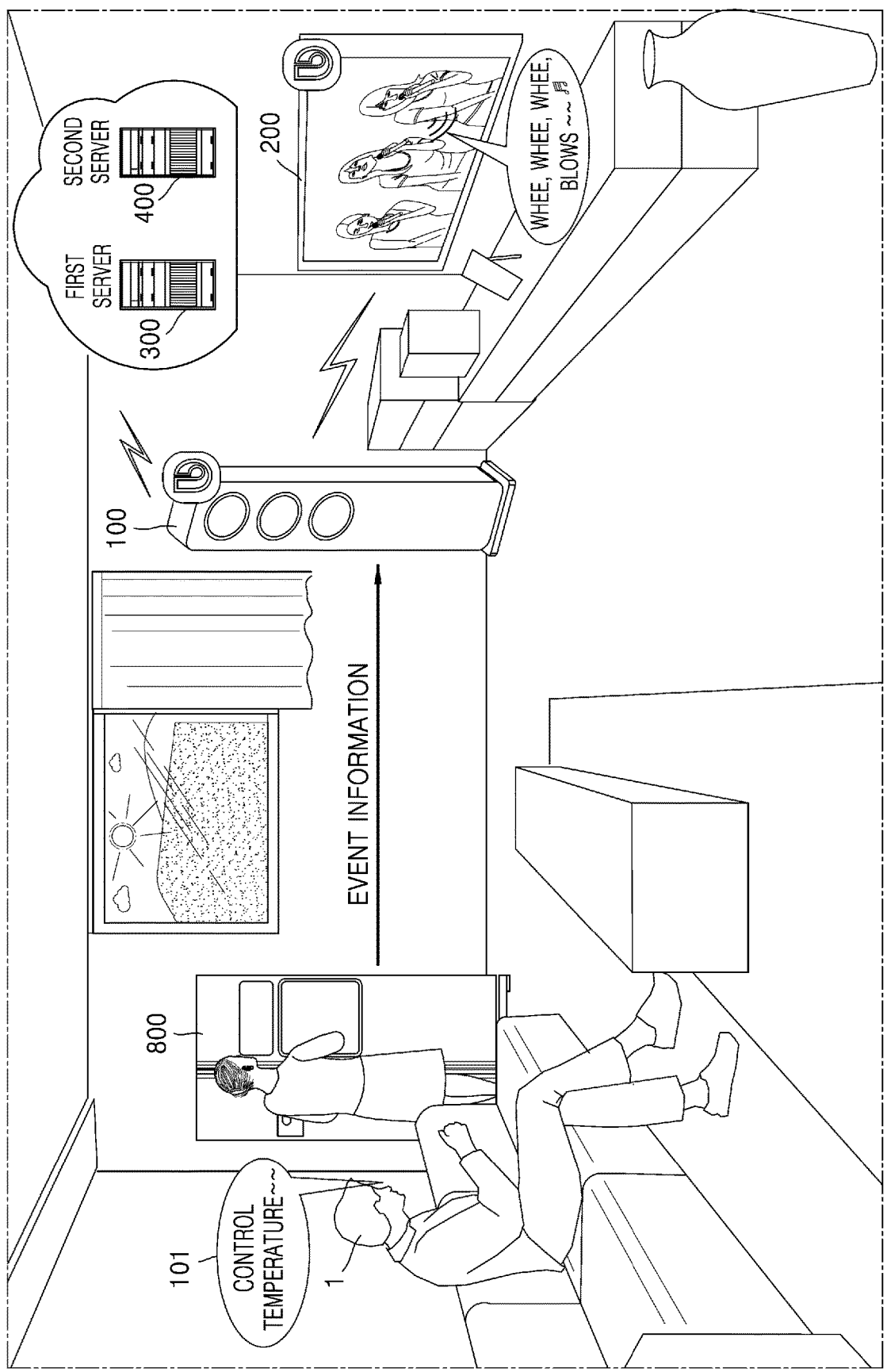

FIG. 6 is a block diagram of a network system according to an embodiment of the present disclosure.

The network system may include an air conditioner 100, a first external device 200, a first server 300, a second server 400, and a sixth external device 800. The air conditioner 100, the first external device 200, the first server 300, and the second server 400 may correspond to the air conditioner 100, the first external device 200, the first server 300, and the second server 400 in FIG. 1, respectively. The sixth external device 800 may include a device capable of generating an event signal according to a user input. Alternatively, the sixth external device 800 may be a device capable of transmitting, to an external device, event information corresponding to an event signal generated during the use or operation of the sixth external device 800.

In this situation, a user 1 may utter a voice 101 for controlling the air conditioner 100. The processor 950 of the air conditioner 100 may obtain first sound data including voice data corresponding to the voice 101 of the user through the microphone 945 provided in the air conditioner 100. Also, in a situation in which the user utters the voice 101, the processor 950 of the air conditioner 100 may obtain audio data being output by the first external device 200 through the communicator 930.

The air conditioner 100 may obtain the position of the user by using first sound data, second sound data, and audio data.

The processor 950 of the air conditioner 100 may obtain, from the sixth external device 800, event information corresponding to an event signal generated according to a user action. For example, when the sixth external device 800 is a refrigerator, a user 2 may open or close the refrigerator. When an event signal is generated according to a user action of opening or closing the refrigerator, the sixth external device 800 may transmit event information corresponding to the generated event signal to the air conditioner 100.

The processor 950 of the air conditioner 100 may obtain the position of the user 1 by using the first sound data and the audio data. Also, the air conditioner 100 may obtain the position of another user 2 by using the event information. At this time, the processor 950 of the air conditioner 100 may obtain the position of the other user 2 based on the position information about the sixth external device 800 that has transmitted the event information. The position information about the sixth external device 800 may be prestored in the air conditioner 100. Alternatively, the air conditioner 100 may obtain the position information about the sixth external device 800 by making a request to a home management server (not illustrated) that manages devices in the home. Alternatively, the position information about the sixth external device 800 may be obtained from the sixth external device 800 together with the event information.

The processor 950 of the air conditioner 100 may determine at least one of a recommended temperature and an operation mode to be set on the air conditioner 100 by using the positions of the users 1 and 2 and the ambient temperature of the air conditioner 100 measured in a situation in which the user utters the voice 101. Next, the processor 950 of the air conditioner 100 may set at least one of the determined recommended temperature and the determined operation mode to the air conditioner 100.

Figure 7A:
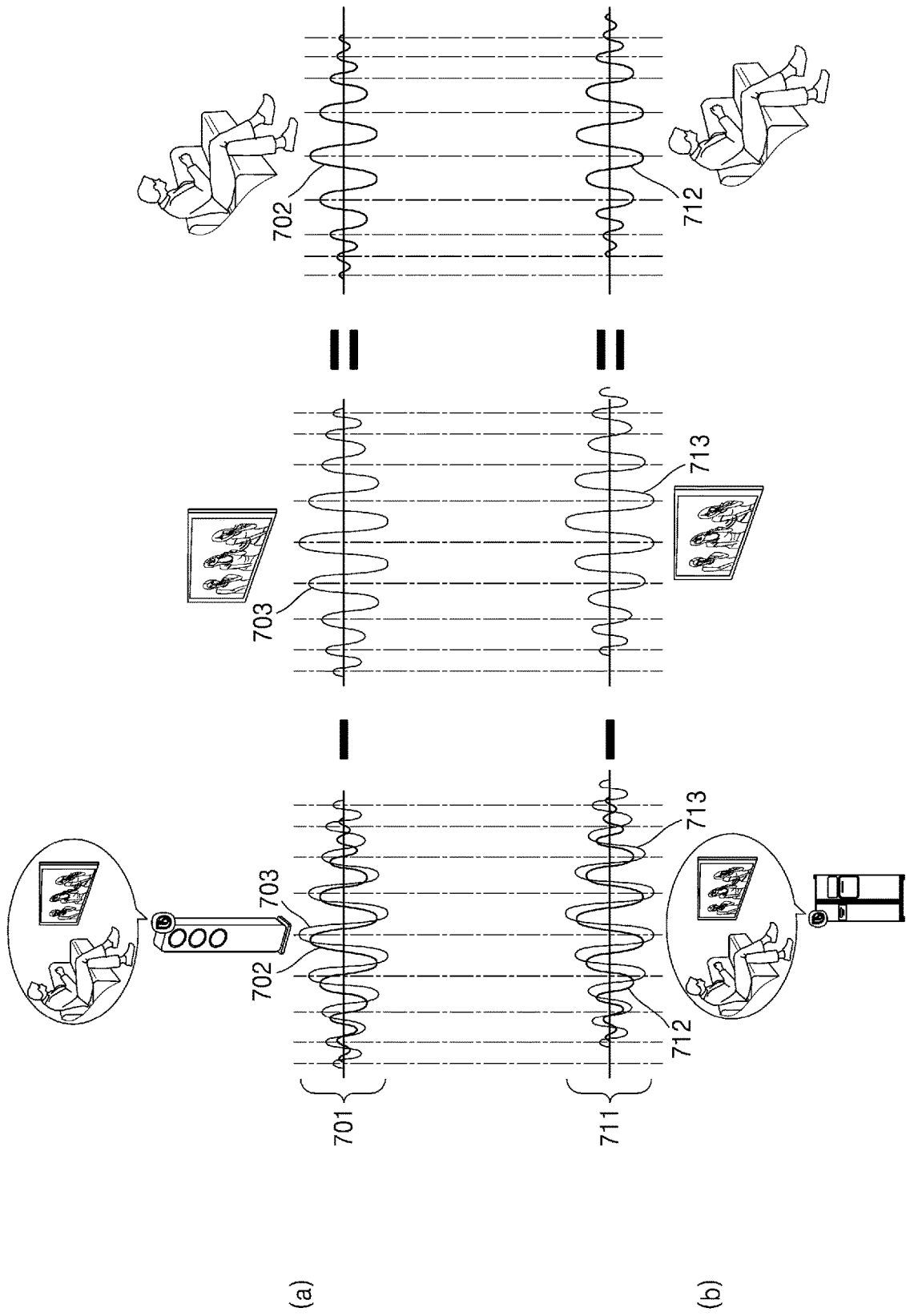
FIGS. 7A, 7B, and 7C are diagrams illustrating a procedure of obtaining a position of a user, according to an embodiment of the present disclosure.

FIG. 7A is a diagram illustrating a procedure of obtaining a position of a user, according to an embodiment of the present disclosure.

In (a) of FIG. 7A, the processor 950 of the air conditioner 100 located at a first position may obtain first sound data 701 including first voice data 702 corresponding to the voice of the user (the voice 101 of the user 1 in FIG. 2) and first audio data 703 being output by an audio output device (e.g., the first external device 200 in FIG. 2) through the microphone 945 provided in the air conditioner 100. In (a) of FIG. 7A, the processor 950 of the air conditioner 100 may obtain the first voice data 702 by removing the first audio data 703 from the first sound data 701.

Also, in (b) of FIG. 7A, a voice recognition device (e.g., the second external device 500 in FIG. 2) located at a second position different from the air conditioner 100 may obtain second sound data 711 including second voice data 712 corresponding to the voice of the user (e.g., the voice 101 of the user 1 in FIG. 2) and second audio data 713 being output by an audio output device (e.g., the first external device 200 in FIG. 2) through the microphone.

The voice recognition device may transmit the obtained second sound data 711 to the air conditioner 100. The processor 950 of the air conditioner 100 may obtain the second voice data 712 by removing the second audio data 713 from the second sound data 711. At this time, the second audio data 713 may be the same audio data as the first audio data 703 obtained from the audio output device.

In various embodiments, the voice recognition device may obtain the second voice data 712 by removing the second audio data 713 from the second sound data 711. The obtained second voice data 712 may be transmitted to the air conditioner 100.

In FIG. 7A, the first sound data 701 and the second sound data 711 may be the same sound data having different phase differences. That is, because the air conditioner 100 located at the first position and the voice recognition device located at the second position are present at different positions, even the same sound may be input to the respective microphones at different times. Therefore, due to the time difference input from the sound source to the respective microphones or the distance difference from the sound source to the respective microphones, the first sound data 701 and the second sound data 711 may be the same sound data having different phase differences or different amplitudes.

In various embodiments, in FIG. 7A, the processor 950 of the air conditioner 100 may obtain the first and second voice data 702 and 712 by additionally removing environmental noise from the first and second sound data 701 and 711. The environmental noise may include other noise around the air conditioner 100 and/or audio noise being output by a third audio output device. The processor 950 of the air conditioner 100 may remove environmental noise by using, for example, a noise canceling technique. The noise canceling technique may include, for example, active noise canceling (ANC) or active noise reduction (ANR), but is not limited to the above example.

In various embodiments, the processor 950 of the air conditioner 100 may remove the first and second audio data 703 and 713 from the first and second sound data 701 and 711 and recognize human voice from the removed first and second audio data 703 and 713 to obtain the first and second voice data 702 and 712, respectively. Therefore, even in a situation in which the audio data 703 includes voice data of a third party, the processor 950 of the air conditioner 100 located at the first position may recognize and extract the voice of the user except for the voice of the third party.

In various embodiments, the air conditioner 100 located at the first position may transmit the first sound data 701, the first audio data 703, the second sound data 711, and the second audio data 713 to an external voice recognition server and obtain the first voice data 702 and the second voice data 712 from the voice recognition server.

In FIG. 7A, when the first voice data 702 at the first position and the second voice data 712 at the second position, which have different phase differences, are obtained, the air conditioner 100 may obtain the position of the user based on at least one of positions at which the first voice data 702 and the second voice data 712 are obtained, a time difference and a phase difference between the first voice data 702 and the second voice data 712, and an amplitude difference between the first voice data 702 and the second voice data 712. For example, the position of the user may be obtained based on a technique used in an array microphone that recognizes a position of a sound source. In this case, at least one of information about the first position and information about the second position may be prestored in the memory 940 of the air conditioner 100. Alternatively, relative information between the first position and the second position (e.g., distance or direction from the first position to the second position) may be prestored in the memory 940 of the air conditioner 100.

When the position of the user is obtained, the processor 950 of the air conditioner 100 may determine at least one of a recommended temperature and an operation mode to be set on the air conditioner 100 by applying the position of the user and the ambient temperature of the air conditioner 100 measured in a situation in which the user utters the voice to a learning model generated by using an AI algorithm. Next, the processor 950 of the air conditioner 100 may set at least one of the determined recommended temperature and the determined operation mode to the air conditioner 100.

Figure 7B:
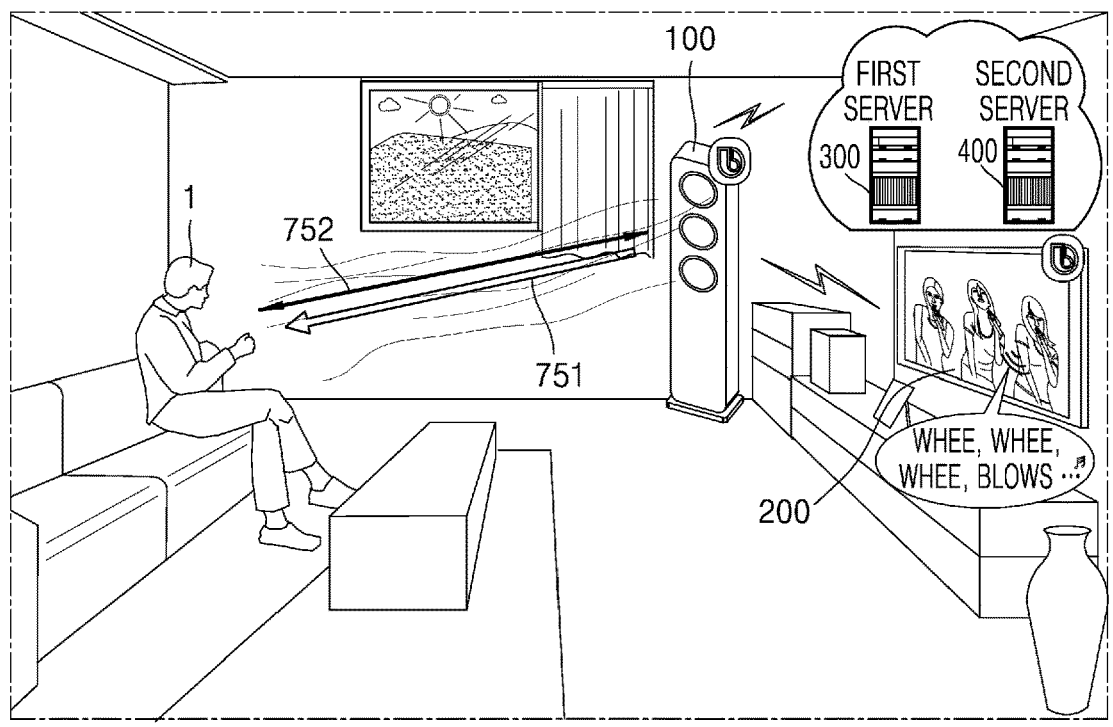
Figure 7B:
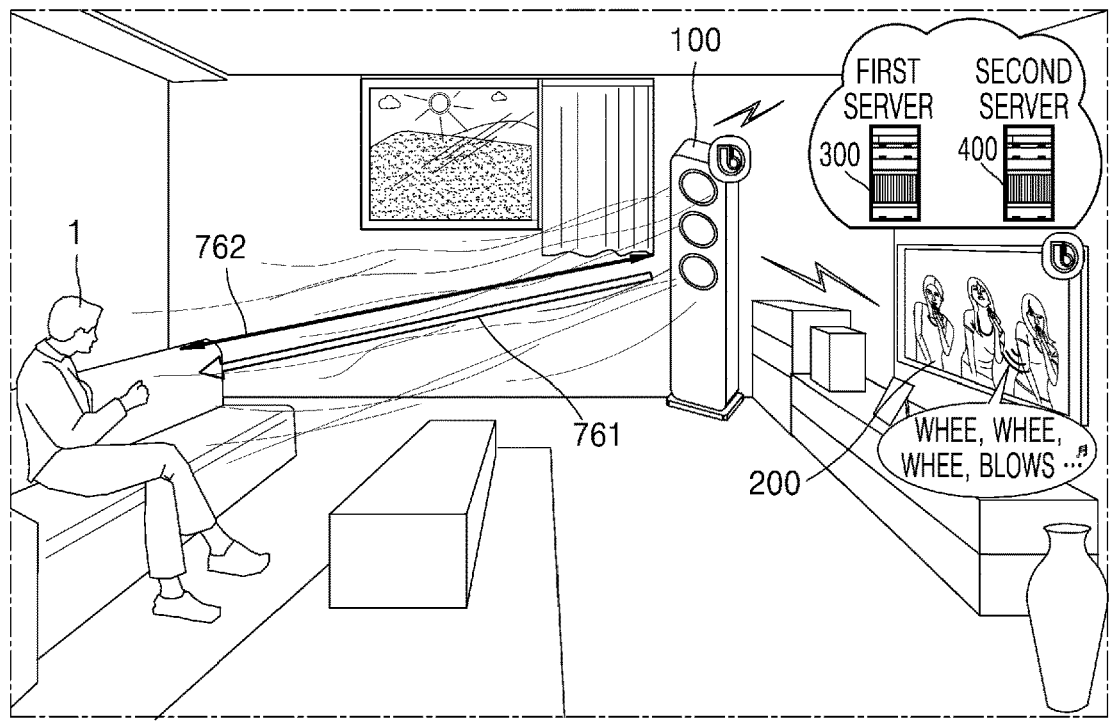

For example, as illustrated in FIG. 7B, an operation mode may be set on the air conditioner 100 based on at least one of the direction from the air conditioner 100 to the user 1 and the distance from the air conditioner 100 to the user 1. For example, when comparing (a) of FIG. 7B with (b) of 7B, the user in (a) of FIG. 7B may be located closer to the air conditioner 100 than the user in (b) of FIG. 7B. In this case, the air conditioner 100 may set at least one of a wind direction and an air volume of the air conditioner 100 based on directions 751 and 761 to the user 1 and distances 752 and 762 to the user 1. For example, the air conditioner 100 may operate to discharge a relatively larger air volume of cold air or warm air in the situation of (a) FIG. 7B than in (b) of FIG. 7B.

Figure 7C:
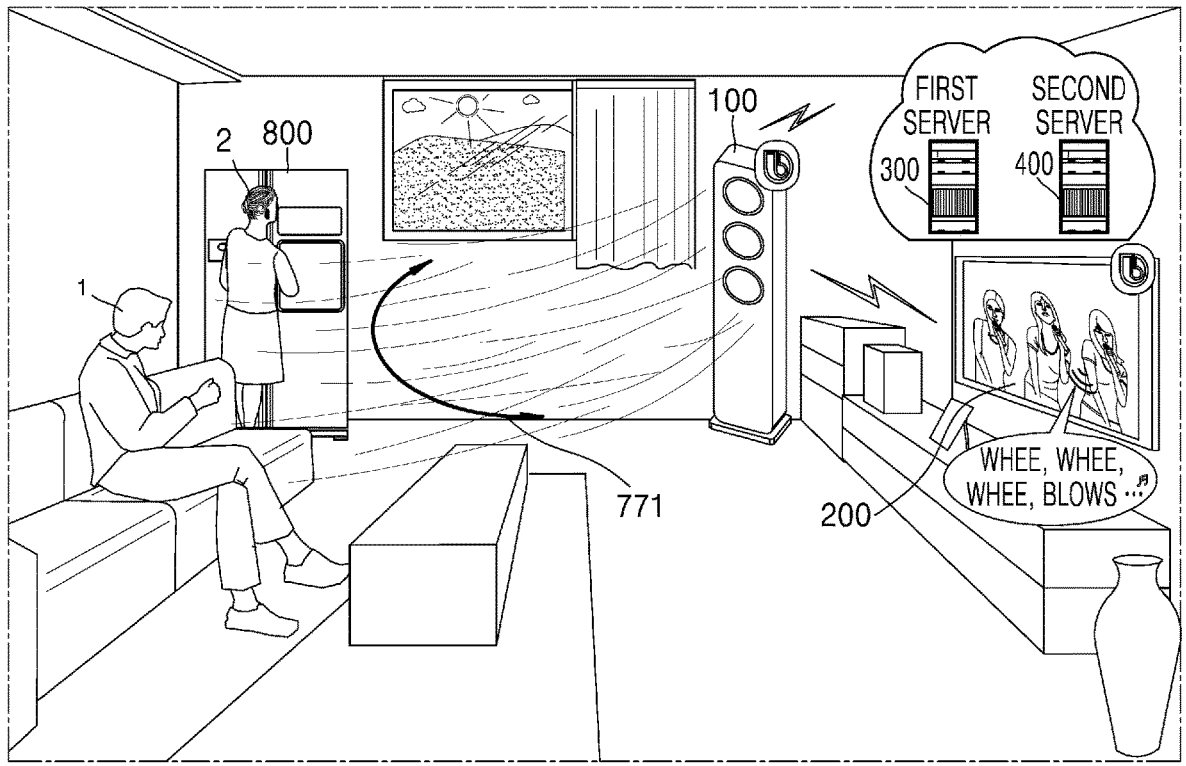
Figure 7C:
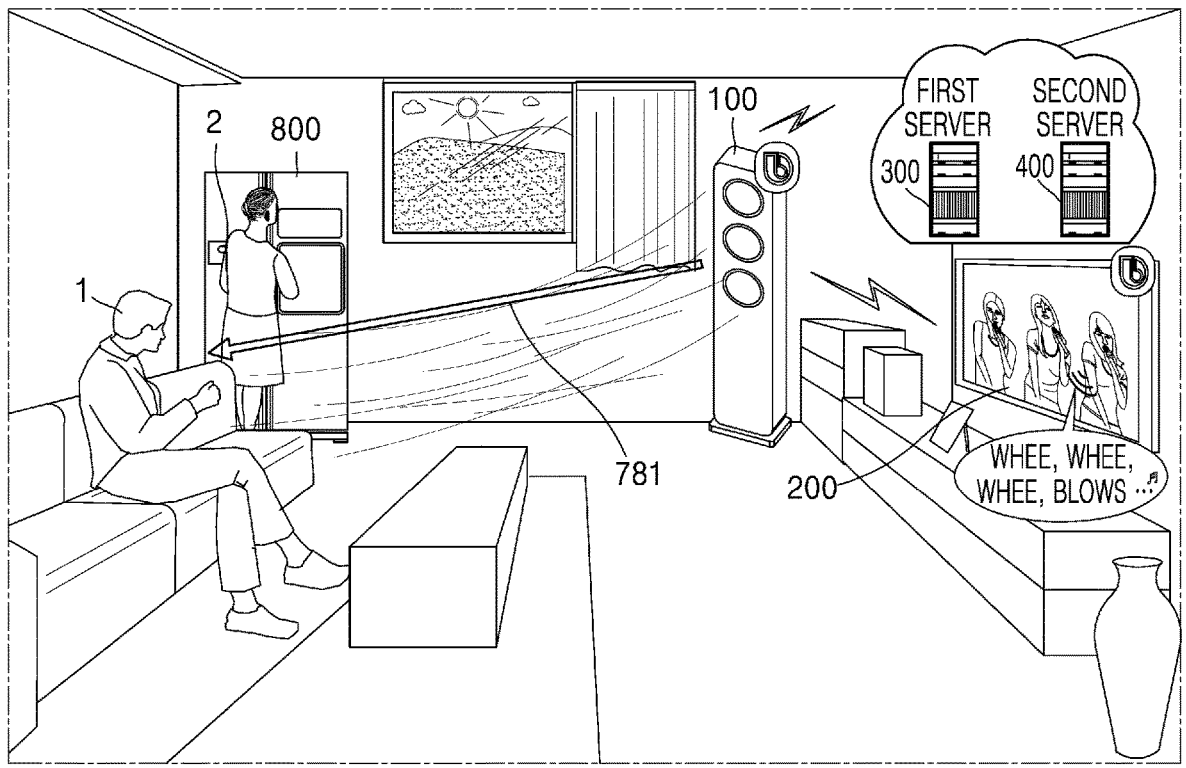

As another example, when a plurality of users 1 and 2 are present, an operation mode may be set to the air conditioner 100 based on at least one of directions from the air conditioner 100 to the users 1 and 2 and distances from the air conditioner 100 to the users 1 and 2. For example, as illustrated in (a) of FIG. 7C, the air conditioner 100 may operate as a rotation mode to provide a wind direction 771 that rotates for a plurality of users 1 and 2. Alternatively, as illustrated in (b) of FIG. 7C, the air conditioner 100 may discharge cold air or warm air in a middle direction 781 of the positions of the users 1 and 2.

Figure 8A:
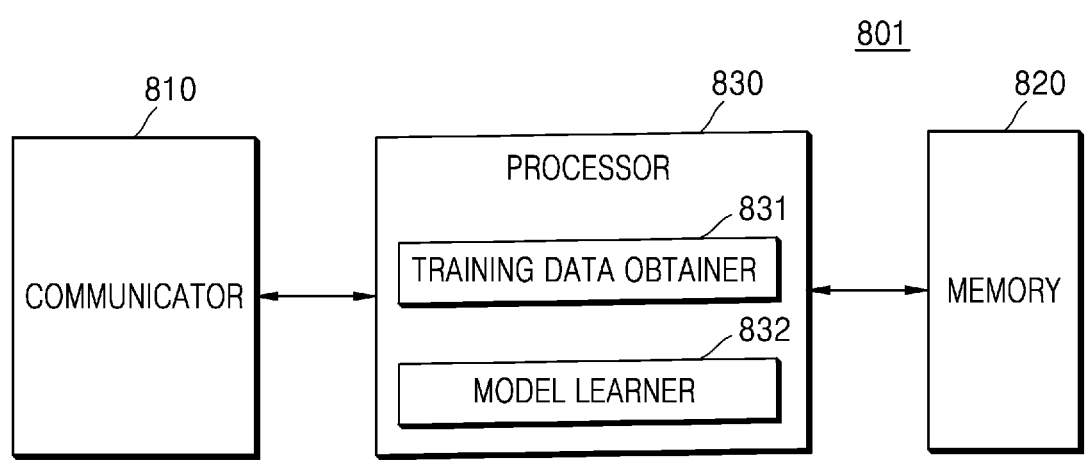
FIGS. 8A and 8B are diagrams illustrating a configuration of an artificial intelligence (AI) server according to an embodiment of the present disclosure.
Figure 8B:
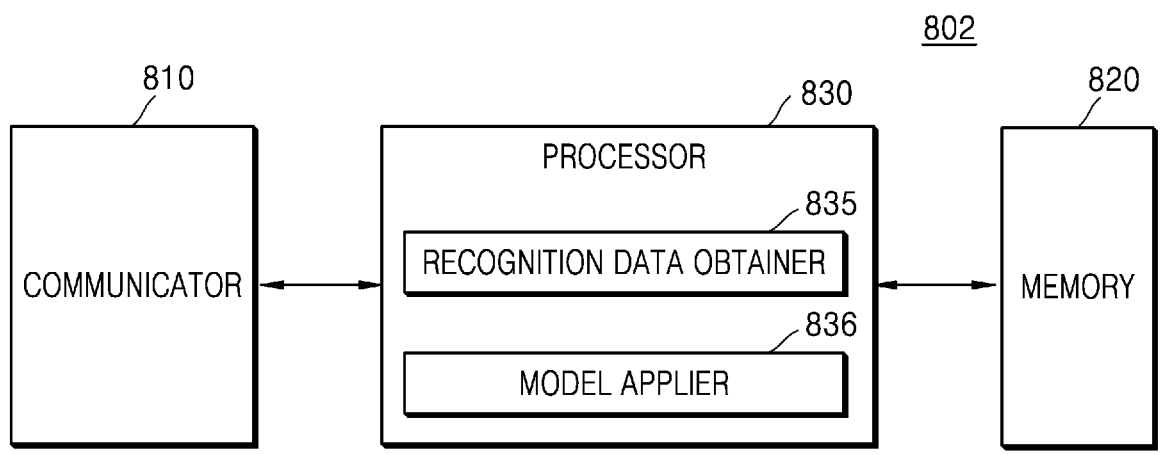

FIGS. 8A and 8B are diagrams illustrating a configuration of an AI server according to an embodiment of the present disclosure.

An example in which the air conditioner 100 according to the present disclosure obtains at least one of the recommended temperature and the operation mode of the air conditioner 100 by applying the position of the user who utters voice and the ambient temperature of the air conditioner 100 measured in a situation in which the user utters the voice to the AI server will be described in detail. The AI server may be, for example, a server that generates a learning model using an AI algorithm or uses the learning model. The AI server includes, for example, an AI system that implements human-level intelligence. Unlike an existing rule-based smart system, the AI system is a smart system that enables a machine to perform learning and determination by itself and becomes more intelligent As the use of the AI system is increased, a recognition rate of the AI system may be improved and a user's preference may be understood more accurately. AI technology includes machine learning (deep learning) and element technologies using machine learning. The machine learning is an algorithm technology for classifying and learning characteristics of input data by itself. The element technology is a technology using a machine learning algorithm such as deep learning. The element technology includes technical fields such as linguistic understanding, visual understanding, inference or prediction, knowledge representation, and motion control.

The AI server may include at least one of a data training server 801 and a data recognition server 802. The data training server 801 and the data recognition server 802 may each be implemented as one or more servers. When the data training server 801 and the data recognition server 802 are physically separated from each other, the data training server 801 and the data recognition server 802 may be communicatively connected to each other through a local area network or a wide area network.

FIG. 8A is a functional block diagram of the data training server 801, and FIG. 8B is a functional block diagram of the data recognition server 802. In FIGS. 8A and 8B, it is assumed that the data training server 801 and the data recognition server 802 are the same server. Hereinafter, the data training server 801 and the data recognition server 802 are collectively referred to as an AI server.

In FIGS. 8A and 8B, the AI server may include a communicator 810, a memory 820, and a processor 830.

The communicator 810 may communicate with an external device. The external device may include, for example, the air conditioner 100. The communicator 810 may perform wired or wireless communication with the external device. The wireless communication may include, for example, cellular communication, short-range wireless communication, or global navigation satellite system (GNSS) communication. The cellular communication may include, for example, Long-Term Evolution (LTE), LTE Advance (LTE-A), code division multiple access (CDMA), wideband CDMA (WCDMA), universal mobile telecommunications system (UMTS), Wireless Broadband (WiBro) or Global System for Mobile Communications (GSM). The short-range wireless communication may include, for example, WiFi, WiFi Direct, light fidelity (LiFi), Bluetooth, Bluetooth Low Power (BLE), Zigbee, near field communication (NFC), magnetic secure transmission, radio frequency (RF), or body area network (BAN). In the present disclosure, that the communicator 810 of the AI server performs communication with the air conditioner may include a direct connection using a short-range communication technology or a communicative connection through a third repeater. The third repeater may include, for example, at least one of a base station, a hub, an access point, a gateway, a switch, a relay server, and/or a repeater server.

The memory 820 may store a learning model trained by using an AI algorithm. The memory 820 may include a volatile memory or a non-volatile memory. The volatile memory may include, for example, random access memory (RAM) (e.g., dynamic RAM (DRAM), static RAM (SRAM), or synchronous DRAM (SDRAM). The non-volatile memory may include, for example, one time programmable read-only memory (OTPROM), programmable read-only memory (PROM), erasable programmable read-only memory (EPROM), and electrically erasable programmable read-only (EPMROM). memory), mask ROM, flash ROM, flash memory, hard drive, or solid state drive (SSD).

The processor 830 may include at least one of a central processing unit, an application processor, a graphic processing unit (GPU), a camera image signal processor, or a communication processor (CP). According to an embodiment, the processor 830 may be implemented as a system on chip (SoC) or a system in package (SiP). The processor 830, for example, may drive an operating system or an application program to control at least one other element (e.g., hardware or software element) of the AI server connected to the processor 830 and perform a variety of data processing and calculations. The processor 830 may load a command or data received from other elements (e.g., the communicator 810) into a volatile memory, process the command or data, and store resultant data in a non-volatile memory.

The processor 830 of FIG. 8A may be described as a functional block diagram for generating a learning model.

In FIG. 8A, the processor 830 may include a training data obtainer 831 and a model learner 832.

The training data obtainer 831 may obtain, through the communicator 810, at least one of a set temperature of the air conditioner 100, an ambient temperature of the air conditioner 100 when the temperature is set, position information about a user when the temperature is set, and an operation mode of the air conditioner 100 when the temperature is set. For example, the training data obtainer 831 may obtain at least one of a set temperature of the air conditioner 100, an ambient temperature of the air conditioner 100 when the temperature is set, position information about a user when the temperature is set, and an operation mode of the air conditioner 100 when the temperature is set.

At this time, for example, the position information about the user may be obtained from information directly input to the air conditioner 100 by the user or may be obtained from surrounding sound data processed by the air conditioner 100. For example, when the user utters voice, the air conditioner 100 may obtain first sound data including a user's voice data through the microphone 945. The air conditioner 100 may obtain, through the communicator 810, second sound data including the user's voice data that is obtained by the first external device located at a second position different from a first position where the air conditioner 100 is located. Also, in a situation in which the user utters the voice, the air conditioner 100 may obtain, through the communicator 810, audio data output by the first external device or the second external device. The air conditioner 100 may obtain the position of the user by using the first sound data, the second sound data, and the audio data. For example, the air conditioner 100 may extract the user's voice data included in the first sound data and the user's voice data included in the second sound data by removing the audio data from the first sound data and the second sound data, and may obtain the position of the user based on at least one of a phase difference and an amplitude difference between the extracted voice data.

Also, the training data obtainer 831 may further obtain external environment information through the communicator 810. The external environment information may include at least one of external temperature and external humidity. For example, the training data obtainer 831 may obtain external environment information from an external content providing server (not illustrated).

The model learner 832 may generate or update a learning model by using at least one of the obtained set temperature, ambient temperature, position information about the user, and operation mode. When the training data obtainer 831 further obtains the external environment information, the model learner 832 may generate or update a learning model by using the set temperature, the ambient temperature, the position information about the user, the operation mode, and the external environment information. Also, when the training data obtainer 831 further obtains time information when the temperature of the air conditioner 100 is set, the model learner 832 may generate or update a learning model by using the set temperature, the ambient temperature, the position information about the user, the operation mode, and the time information. In various embodiments, the model learner 832 may generate or update a learning model by using at least one of a plurality of set temperatures, a plurality of ambient temperatures, a plurality of pieces of position information about a plurality of users, and a plurality of operation modes. At this time, the set temperatures, the ambient temperatures, the pieces of position information about the users, and the operation modes may configure a training data pair based on the temperature setting time. For example, {set temperature, ambient temperature, position information about user, operation mode} when the user sets the temperature of the air conditioner 100 may be used to generate or update the learning model as one training data pair.

The memory 820 may store the learning model configured to provide at least one of the recommended temperature and the operation mode as a result of generating or updating the learning model.

At this time, the learning model may be, for example, a model based on a neural network. The learning model may be designed to simulate a human brain structure on a computer. The learning model may include a plurality of network nodes having weights, which simulate neurons of a human neural network. The network nodes may form a connection relationship such that the neurons simulate the synaptic activity of the neurons that exchange signals through synapses. The learning model may include, for example, a neural network model, or a deep learning model developed from the neural network model. In the deep learning model, a plurality of network nodes may be located at different depths (or layers) and exchange data according to a convolutional connection relationship. For example, a model such as a deep neural network (DNN), a recurrent neural network (RNN), or a bidirectional recurrent deep neural network (BRDNN) may be used as the data recognition model.

In various embodiments, when the model learner 832 generates or updates a plurality of learning models according to a position of a user, an operation mode, or a specific period, the memory 820 may store the respective learning models.

In various embodiments, a customized learning model may be generated for each user using an air conditioner. Therefore, an optimal recommended temperature and operation mode suitable for each of a plurality of users may be provided.

The processor 830 of FIG. 8B may be described as a functional block diagram using a learning model.

In FIG. 8B, the processor 830 may include a recognition data obtainer 835 and a model applier 836. In this case, the memory 820 may be in a situation in which a learning model configured to provide at least one of a recommended temperature and an operation mode to be set on the air conditioner 100 is stored.

In FIG. 8B, the recognition data obtainer 835 may obtain, from the air conditioner 100, the position information about the user who uses the air conditioner 100 and the ambient temperature of the air conditioner 100 measured in a situation in which the user utters the voice.

The model applier 836 may obtain at least one of the recommended temperature and the operation mode to be set on the air conditioner 100 by applying the obtained position information about the user and the ambient temperature of the air conditioner 100 measured in a situation in which the user utters the voice to a learning model trained by an AI algorithm.

When the recognition data obtainer 835 further obtains external environment information, the model applier 836 may obtain at least one of the recommended temperature and the operation mode to be set on the air conditioner 100 by applying the position information about the user, the ambient temperature, and the external environment information to the learning model.

When the recognition data obtainer 835 further obtains time information, the model applier 836 may obtain at least one of the recommended temperature and the operation mode to be set on the air conditioner 100 by applying the position information about the user, the ambient temperature, and the time information to the learning model.

The communicator 810 may transmit at least one of the obtained recommended temperature and the obtained operation mode to an external device. The external device may be, for example, the air conditioner 100 or a third device communicatively with the air conditioner 100.

Figure 9:
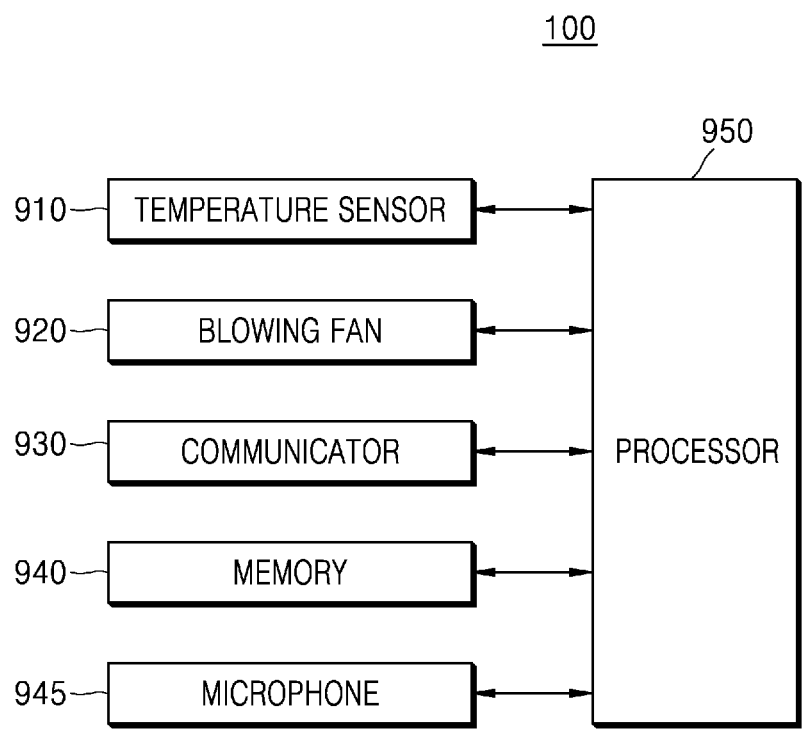
FIG. 9 is a block diagram illustrating a configuration of an air conditioner, according to an embodiment of the present disclosure.

FIG. 9 is a block diagram illustrating a configuration of an air conditioner 100, according to an embodiment of the present disclosure.

Referring to FIG. 9, the air conditioner 100 may include a temperature sensor 910, a blowing fan 920, a communicator 930, a memory 940, and a processor 950. In various embodiments, the air conditioner 100 may omit at least one of the above-described elements or may further include other elements.

The temperature sensor 910 may sense an indoor temperature around the air conditioner 100.

The blowing fan 920 may discharge cold air or warm air to the outside through an opening and closing portion. Alternatively, in a wind-free mode, the blowing fan 920 may discharge cold air or warm air to the outside through a plurality of micro-holes at or below a preset flow rate. In this case, the preset flow rate may be 0.25 m/s or less, for example, 0.15 m/s or less.

The communicator 930 may communicate with an external device. In this case, the external device may include at least one of an AI server, an external voice recognition device, an external audio output device, and a user terminal capable of remotely controlling the air conditioner 100. That the communicator 930 communicates with the external device may include communicating with the external device through a third repeater or the like. The third repeater may include, for example, at least one of a base station, a hub, an access point, a gateway, a switch, a relay server, and/or a repeater server.

The communicator 930 may communicate with the external device through wired communication or wireless communication. For example, the communicator 930 may perform communication according to a port connected using a cable and standards such as cellular communication, local area communication, communication with a control terminal device via an Internet network, universal serial bus (USB) communication, Wi-Fi, Bluetooth, Zigbee, IrDA, RF such as UHF and VHF, and ultra-wideband (UWB) communication.

The memory 940 stores various software and programs for performing the functions of the air conditioner 100. Specifically, the memory 940 may store temperature control algorithms according to a plurality of operation modes. The temperature control algorithms may include a change in the set temperature, the intensity of the wind, the direction of the wind, and the like according to a preset period for each operation mode. Also, the memory 940 according to the present disclosure may store a learning model trained based on a set temperature and an ambient temperature.

The microphone 945 generates (or converts) a voice or a sound received from the outside into an electrical signal under the control of the processor 950. The electrical signal generated by the microphone 945 may be converted in an audio codec under the control of the processor 950 and stored in the memory 940.

The processor 950 may read programs or the like stored in the memory 840. Specifically, in order to perform the functions of the air conditioner 100, the processor 950 may read programs including a series of readable commands and perform air conditioning according to the set temperature.

The processor 950 may sense a pressure and/or a temperature of a refrigerant in an indoor heat exchanger and detect whether normal air conditioning is being performed. For example, the processor 950 may detect whether an indoor heat exchanger pipe is damaged or frosted and whether water obtained when water vapor in the air is condensed is appropriately removed.

The processor 950 may control the speed of the blowing fan 920. Specifically, the processor 950 may control the rotating speed of the blowing fan 920 according to the set temperature and the ambient temperature measured by the temperature sensor 910. Specifically, the processor 950 may control the rotating speed of the blowing fan 920 according to a difference between the ambient temperature and the set temperature. For example, when the difference between the ambient temperature and the set temperature is great, the rotating speed of the blowing fan 920 may be controlled to increase such that the ambient temperature reaches the set temperature quickly. When the difference between the ambient temperature and the set temperature is small or when the ambient temperature reaches the set temperature, the rotating speed of the blowing fan 920 may be slowed such that a compressor of an outdoor unit is not turned off because the indoor temperature is excessively lowered. For example, the processor 950 may control the rotating speed of the blowing fan 920 in a range between 500 RPM and 900 RPM. The processor 950 may control the communicator 930 such that the set temperature and the ambient temperature sensed by the temperature sensor 910 are transmitted to the external device.

In various embodiments, the memory 940 may store at least one instruction configured such that the processor 950 obtains first sound data including user's voice data through the microphone 945 when the user utters the voice, obtains second sound data including the user's voice data, obtained by the first external device located at the second position different from the first position where the air conditioner 100 is located, through the communicator 930, obtains audio data output by the first external device or the second external device through the communicator 930 in a situation in which the user utters the voice, obtains the position of the user by using the first sound data, the second sound data, and the audio data, obtains at least one of the recommended temperature and the operation mode to be set on the air conditioner 100 by applying the obtained position of the user and ambient temperature of the air conditioner 100 to a learning model trained by using an AI algorithm, and sets at least one of the obtained recommended temperature and the obtained operation mode to the air conditioner 100. In this case, the learning model may be trained by using at least one of a plurality of ambient temperatures, a plurality of set temperatures, a plurality of pieces of position information, and a plurality of operation modes.

In various embodiments, the memory 940 may store at least one instruction configured such that the processor 950 extracts the user's voice data included in the first sound data and the user's voice data included in the second sound data by removing the audio data from the first sound data and the second sound data, and obtains the position of the user based on at least one of a phase difference and an amplitude difference between the extracted voice data.

In various embodiments, the memory 940 may store at least one instruction configured such that the processor 950 extracts the user's voice data included in the first sound data and the user's voice data included in the second sound data by removing the audio data and the environmental noise around the air conditioner 100 from the first sound data and the second sound data.

In various embodiments, the memory 940 may store at least one instruction configured such that the processor 950 obtains the position of the user by applying the first sound data, the second sound data, and the audio data to a learning model generated by using an AI algorithm.

In various embodiments, the memory 940 may store at least one instruction configured such that, when the processor 950 determines at least one of the recommended temperature and the operation mode to be set on the air conditioner 100, the processor 950 obtains at least one of the recommended temperature and the operation mode to be set on the air conditioner when the voice of the user is recognized as a voice request to control the set temperature of the air conditioner 100.

In various embodiments, when the first sound data and the second sound data include voice data of the user and voice data of another user, respectively, the memory 940 may store at least one instruction configured such that the processor 950 obtains positions of a plurality of users by using the first sound data, the second sound data, and the audio data.

In various embodiments, the memory 940 may store at least one instruction configured such that the processor 950 determines at least one of the recommended temperature and the operation mode to be set on the air conditioner 100 by applying the positions of the users and the ambient temperature of the air conditioner 100 to a learning model.

In various embodiments, the memory 940 may store at least one instruction configured such that the processor 950 obtains position information about the first external device and obtains the position of the user by using the position information, the first sound data, the second sound data, and the audio data.

In various embodiments, the memory 940 may store at least one instruction configured such that the processor 950 obtains information about a captured image of a room where the air conditioner 100 is located and obtains the position of the user by using the information about the captured image, the first sound data, the second sound data, and the audio data.

In various embodiments, the memory 940 may store at least one instruction configured such that event information corresponding to an event signal generated by a third external device according to a user action is obtained and the position of the user is obtained by using the event information, the first sound data, the second sound data, and the audio data.

In various embodiments, the operation mode may be determined based on at least one of a direction from the air conditioner 100 to the user and a distance from the air conditioner 100 to the user.

FIG. 10 is a flowchart of the air conditioner according to an embodiment of the present disclosure.

In operation 1001, the air conditioner 100 may obtain first sound data including a user's voice data through the microphone 945.

In operation 1003, the air conditioner 100 may obtain second sound data including a user's voice data obtained by the first external device. Operation 1003 may be performed preemptively before operation 1001. At this time, a position where the air conditioner 100 including the microphone is installed may be different from a position where the first external device is installed.

In operation 1005, in a situation in which the user utters the voice, the air conditioner 100 may obtain audio data output by the first external device or the second external device. Operation 1005 may be performed preemptively before operation 1001 or operation 1003.

In operation 1007, the air conditioner 100 may obtain the position of the user by using the first sound data, the second sound data, and audio data.

In various embodiments, the air conditioner 100 may extract the user's voice data included in the first sound data and the user's voice data included in the second sound data by removing the audio data from the first sound data and the second sound data. Next, the air conditioner 100 may obtain the position of the user based on at least one of a phase difference and an amplitude difference between the pieces of extracted voice data.

In various embodiments, the air conditioner 100 may extract the user's voice data included in the first sound data and the user's voice data included in the second sound data by removing audio data and environmental noise around the air conditioner 100 from the first sound data and the second sound data. Next, the air conditioner 100 may obtain the position of the user based on at least one of a phase difference and an amplitude difference between the pieces of extracted voice data.

In various embodiments, the air conditioner 100 may obtain the position of the user by applying the first sound data, the second sound data, and the audio data to a learning model generated by using an AI algorithm.

In various embodiments, the first sound data and the second sound data may include voice data of the user and voice data of another user, respectively. In this case, the air conditioner 100 may obtain the positions of a plurality of users by using the first sound data, the second sound data, and the audio data. Next, the air conditioner 100 may obtain at least one of a recommended temperature and an operation mode to be set on the air conditioner 100 by applying the positions of the users and the ambient temperature of the air conditioner 100 to a learning model.

In various embodiments, the air conditioner 100 may obtain position information about the first external device. The air conditioner 100 may obtain the position of the user by using the position information, the first sound data, the second sound data, and the audio data.

In various embodiments, the air conditioner 100 may obtain information about the captured image of the room where the air conditioner 100 is located. The air conditioner 100 may obtain the position of the user by using the information about the captured image, the first sound data, the second sound data, and the audio data.

In various embodiments, the air conditioner 100 may obtain event information corresponding to an event signal generated by the third external device according to a user action. The air conditioner 100 may obtain the position of the user by using the event information, the first sound data, the second sound data, and the audio data.

In operation 1009, the air conditioner 100 may obtain at least one of the recommended temperature and the operation mode to be set on the air conditioner 100 by applying the obtained position of the user and the ambient temperature of the air conditioner 100 to a learning model generated by using an AI algorithm.

In various embodiments, when the voice of the user is recognized as a voice request to control the set temperature of the air conditioner, the air conditioner 100 may obtain at least one of the recommended temperature and the operation mode to be set on the air conditioner 100.

In operation 1011, the air conditioner 100 may set at least one of the obtained recommended temperature and the obtained operation mode to the air conditioner 100.

The terms used in the present disclosure are used to describe the embodiments and are not intended to limit and/or restrict the present disclosure. As used herein, the singular forms "a," "an," and "the" are intended to include the plural forms as well, unless the context clearly indicates otherwise. The terms "comprises," "comprising," "including," and "having," as used in the present disclosure are inclusive and therefore specify the presence of stated features, integers, steps, operations, elements, or components, but do not preclude the presence or addition of one or more other features, integers, steps, operations, elements, components, or combinations thereof.

The various embodiments of the present disclosure and the terms used herein are not intended to limit the technologies described in the present disclosure to specific embodiments, and it will be understood to include various modifications, equivalents, and/or alternatives of the embodiments. In connection with the description of the drawings, similar reference numerals may be used to refer to similar elements. As used herein, the singular forms "a," "an," and "the" are intended to include the plural forms as well, unless the context clearly indicates otherwise. The expressions "A or B," "at least one of A and/or B," "A, B, or B", or "one or more of A, B, and/or C" as used herein may include all possible combinations of items listed together. The terms "first," "second," etc. may modify the corresponding elements regardless of order and/or importance and are only used to distinguish one element from another. However, these terms do not limit the elements. When a certain element (e.g., a first element) is "(operatively or communicatively) coupled with/to" or "connected to" another element (e.g., a second element), it will be understood that the certain element may be connected to the other element directly or through another element (e.g., a third element).

The term "module" as used herein includes a unit including hardware, software, or firmware and may be used interchangeably with the terms "logic," "logic blocks," "components," "circuits," and the like. The module may be an integrally formed part or a minimum unit for performing one or more functions or a part thereof. For example, the module may include an application-specific integrated circuit (ASIC).

Various embodiments of the present disclosure may be implemented as software that includes instructions stored in a machine-readable storage media (or a computer-readable storage media). The machine is a machine capable of calling the stored instructions from the storage media and operating according to the called instructions. The machine may include the air conditioner 100 and the AI server according to the embodiments of the present disclosure. When the commands are executed by the processor, the processor may perform functions corresponding to the commands by using other elements directly or under the control of the processor. The commands may include codes generated or executed by a compiler or an interpreter. The machine-readable storage media may be provided in the form of a non-transitory storage media. The term "non-transitory" means that the storage media does not include a signal and is tangible, and does not limit that data is stored in the storage media semi-permanently or temporarily.

According to an embodiment, the methods according to various embodiments of the present disclosure may be provided in a state of being included in a computer program product. The computer program product may be traded between a seller and a buyer as a product. The computer program product may include a machine-readable storage media (e.g., compact disc read only memory (CD-ROM)) or a program that may be transmitted through a wired/wireless network. For example, the computer program product may be distributed online through an application store (e.g., Play Store™). In the case of the online distribution, at least a part of the computer program product may be at least temporarily stored or temporarily created in a storage media such as a memory of a server of a manufacturer, a server of an application store, or a relay server. The machine (e.g., the air conditioner 100 or the AI server) of the present disclosure may download and install the computer program product through the application store and may perform the various embodiments of the present disclosure by using the downloaded computer program product.

Each element (e.g., a module or a program) according to various embodiments may include one or more entities, and a part of the above-described sub-elements may be omitted or other sub-elements may be further included in various embodiments. Alternatively or additionally, some elements (e.g., modules or programs) may be integrated into a single entity to perform the same or similar functions performed by each corresponding element prior to integration. The operations performed by the module, program, or other elements, according to various embodiments, may be executed sequentially, in parallel, iteratively, or heuristically, or at least some of the operations may be executed in a different order or omitted, or other operations may be added.

What is claimed is:

1. An air conditioner comprising:
 a microphone;
 a blowing fan
 a temperature sensor;
 a communicator;
 at least one processor electrically connected to the microphone, the temperature sensor, and the communicator; and
 a memory electrically connected to the at least one processor,
 wherein the memory stores at least one instruction executable by the at least one processor to:
  obtain first sound data including user voice data for air conditioner control through the microphone;
  obtain, through the communicator, second sound data including the user voice data, the second sound data being obtained by a first external device located at a second position different from a first position where the air conditioner is located;
  obtain audio data corresponding to sound output by the first external device or a second external device, through the communicator;
  obtain a user position using the first sound data, the second sound data, and the audio data;
  obtain at least one of a temperature setting and an operation mode for the air conditioner by applying the obtained user position and an ambient temperature sensed by the temperature sensor to a first learning model trained using an artificial intelligence (AI) algorithm; and
  control the air conditioner based on at least one of the obtained temperature setting or the obtained operation mode, and
 wherein the learning model is trained using at least one of a plurality of ambient temperatures, a plurality of temperature settings, a plurality of pieces of position information, and a plurality of operation modes.

2. The air conditioner of claim 1, wherein the memory stores at least one instruction executable by the at least one processor to:
 extract the user voice data included in the first sound data and the user voice data included in the second sound data by removing the audio data from the first sound data and the second sound data; and
 obtain the user position based on at least one of a phase difference or an amplitude difference between pieces of extracted user voice data.

3. The air conditioner of claim 1, wherein the memory stores at least one instruction executable by the at least one processor to:

extract the user voice data included in the first sound data and the user voice data included in the second sound data by removing the audio data and environmental noise around the air conditioner from the first sound data and the second sound data; and obtain the user position based on at least one of a phase difference or an amplitude difference between pieces of extracted user voice data.

4. The air conditioner of claim 1, wherein the memory stores at least one instruction executable by the at least one processor to obtain the user position by applying the first sound data, the second sound data, and the audio data to a second learning model generated using an AI algorithm.

5. The air conditioner of claim 1, wherein the memory stores at least one instruction executable by the processor to obtain the at least one of the temperature setting or the operation mode based on the user voice being recognized as a voice request for controlling the air conditioner.

6. The air conditioner of claim 1, wherein the memory stores at least one instruction executable by the at least one processor to control the air conditioner, based on the first sound data and the second sound data each including user voice data of a plurality of users, to:

obtain positions of the plurality of users using the first sound data, the second sound data, and the audio data; and obtain the at least one of the temperature setting or the operation mode by applying the obtained positions of the plurality of users and the ambient temperature to the first learning model.

7. The air conditioner of claim 1, wherein the memory stores at least one instruction executable by the at least one processor to:

obtain first external device position information about the first external device; and obtain the user position using the first external device position information, the first sound data, the second sound data, and the audio data.

8. The air conditioner of claim 1, wherein the memory stores at least one instruction executable by the at least one processor to:

obtain information about a captured image of a room where the air conditioner is located; and obtain the user position using the information about the captured image, the first sound data, the second sound data, and the audio data.

9. The air conditioner of claim 1, wherein the memory stores at least one instruction executable by the at least one processor to:

obtain event information corresponding to an event signal generated by a third external device; and obtain the user position using the event information, the first sound data, the second sound data, and the audio data.

10. The air conditioner of claim 1, wherein the operation mode is determined based on at least one of a direction from the air conditioner to the obtained user position and a distance from the air conditioner to the obtained user position.

11. The air conditioner of claim 1, wherein the processor is configured to control the communicator to establish a communicative connection with the first external device.

12. The air conditioner of claim 11, wherein the audio data is obtained from the first external device in response to a command request communicated to the first external device communicated over the communication connection.

13. A method of controlling an air conditioner, the method comprising:

obtaining first sound data including user voice data for air conditioner control through a microphone;

obtaining second sound data including the user voice data obtained by a first external device;

obtaining audio data corresponding to sound output by the first external device or a second external device;

obtaining a user position using the first sound data, the second sound data, and the audio data;

obtaining at least one of a temperature setting or an operation mode for the air conditioner by applying the obtained user position and an ambient temperature of the air conditioner to a first learning model generated using an artificial intelligence (AI) algorithm; and controlling the air conditioner based on at least one of the obtained temperature setting or the obtained operation mode.

14. The method of claim 13, further comprising:

extracting the user voice data included in the first sound data and the user voice data included in the second sound data by removing the audio data from the first sound data and the second sound data; and obtaining the user position based on at least one of a phase difference or an amplitude difference between pieces of extracted user voice data.

15. The method of claim 13, further comprising:

extracting the user voice data included in the first sound data and the user voice data included in the second sound data by removing the audio data and environmental noise around the air conditioner from the first sound data and the second sound data; and obtaining the user position based on at least one of a phase difference or an amplitude difference between pieces of extracted user voice data.

16. The method of claim 13, further comprising obtaining first external device position information about the first external device, wherein the obtaining of the user position comprises obtaining the user position using the first external device position information, the first sound data, the second sound data, and the audio data.

17. A computer program product comprising a non-transitory computer-readable recording medium including at least one instruction, wherein the at least one instruction, when executed by a computer, causes the computer to:

obtain first sound data including user voice data for air conditioner control through a microphone;

obtain second sound data including the user voice data obtained by a first external device;

obtain audio data corresponding to sound output by the first external device or a second external device;

obtain a user position using the first sound data, the second sound data, and the audio data;

obtain at least one of a temperature setting or an operation mode for the air conditioner by applying the obtained user position and an ambient temperature to a first learning model generated using an artificial intelligence (AI) algorithm; and control the air conditioner based on at least one of the obtained temperature setting or the obtained operation mode.

* * * * *